US008264908B2

(12) United States Patent
Walls et al.

(10) Patent No.: US 8,264,908 B2
(45) Date of Patent: Sep. 11, 2012

(54) METHOD OF DETECTING AND COMPENSATING FOR PRECIPITATION IN SODAR SYSTEMS

(75) Inventors: Elizabeth Walls, Lexington, MA (US); Niels LaWhite, Somerville, MA (US)

(73) Assignee: Second Wind Systems, Inc., Somerville, MA (US)

(*) Notice: Subject to any disclaimer, the term of this patent is extended or adjusted under 35 U.S.C. 154(b) by 329 days.

(21) Appl. No.: 12/718,141

(22) Filed: Mar. 5, 2010

(65) Prior Publication Data

US 2010/0226208 A1 Sep. 9, 2010

Related U.S. Application Data

(60) Provisional application No. 61/158,589, filed on Mar. 9, 2009.

(51) Int. Cl.
*G01S 15/88* (2006.01)
(52) U.S. Cl. ................. 367/90; 367/97; 367/98
(58) Field of Classification Search ........... 367/90, 367/902, 97, 98; 73/170.13, 170.17
See application file for complete search history.

(56) References Cited

U.S. PATENT DOCUMENTS

| | | | |
|---|---|---|---|
| 3,675,191 A | 7/1972 | McAllister | |
| 4,286,462 A | 9/1981 | Bourne | |
| 4,558,594 A | 12/1985 | Balser et al. | |
| 4,573,352 A | 3/1986 | Hurtig et al. | |
| 4,641,290 A | 2/1987 | Massa et al. | |
| 4,831,874 A | 5/1989 | Daubin et al. | |
| 4,833,360 A | 5/1989 | Holly | |
| 4,914,750 A | 4/1990 | Lawson | |
| 5,509,304 A | 4/1996 | Peterman et al. | |
| 5,521,883 A | 5/1996 | Fage et al. | |
| 5,544,525 A | 8/1996 | Peterman et al. | |
| 5,808,967 A | 9/1998 | Yu | |
| 5,940,523 A | 8/1999 | Cornman et al. | |
| 6,097,669 A | 8/2000 | Jordan et al. | |
| 6,384,516 B1 | 5/2002 | Fraser | |
| 6,427,531 B1 | 8/2002 | Chintawongvanich | |
| 6,437,738 B1 | 8/2002 | Law | |
| 6,448,923 B1 | 9/2002 | Zrnic et al. | |
| 6,535,158 B2 | 3/2003 | Wilkerson et al. | |
| 6,608,237 B1 | 8/2003 | Li et al. | |
| 6,644,590 B2 | 11/2003 | Terpay | |
| 6,755,080 B2 | 6/2004 | Martin | |
| 6,856,273 B1 | 2/2005 | Bognar | |
| 7,061,475 B2 | 6/2006 | Kent | |
| 2004/0031203 A1 | 2/2004 | Russell et al. | |
| 2004/0041725 A1* | 3/2004 | Matsuda et al. | 342/195 |

(Continued)

OTHER PUBLICATIONS

Notification of Transmittal of International Preliminary Report on Patentability mailed Sep. 22, 2011, in corresponding PCT Application No. PCT/US2010/026472.

(Continued)

*Primary Examiner* — Daniel Pihulic
(74) *Attorney, Agent, or Firm* — Brian M. Dingman; Mirick, O'Connell, DeMallie & Lougee, LLP

(57) ABSTRACT

A method of detecting precipitation with a sodar apparatus that transmits sound beams into the atmosphere, detects echoes returned from the atmosphere, from the echoes determines a Doppler-shifted spectrum comprising the relative strength of the echoes at various Doppler-shifted frequencies, and estimates wind speed and direction. The method includes automatically estimating the presence of precipitation based on the Doppler-shifted spectrum.

29 Claims, 19 Drawing Sheets

U.S. PATENT DOCUMENTS

| | | | |
|---|---|---|---|
| 2005/0036647 | A1 | 2/2005 | Nguyen |
| 2005/0074129 | A1 | 4/2005 | Fan |
| 2005/0165313 | A1 | 7/2005 | Byron et al. |
| 2006/0057351 | A1 | 3/2006 | Yang et al. |
| 2006/0179934 | A1 | 8/2006 | Smith et al. |
| 2006/0225952 | A1 | 10/2006 | Takayasu |
| 2010/0226208 | A1* | 9/2010 | Walls et al. .................. 367/90 |

OTHER PUBLICATIONS

Antoniou et al. On the Theory of SODAR Measurement Techniques (final reporting on WP1, EU Wise Project NNE5-2001-297). Riso National Laboratory, Roskilde, Denmark http://130.226.56.153/rispubl/VEA/veapdf/ris-r-1410.pdf; p. 5, para. 7-8 (last visited Apr. 17, 2010).

Bradley, et al, Sodar Calibration for Wind Energy Applications, Mar. 2005, entire document, ISBN 0-954 1649-1-1.

Hummon, J.M. et al., "A Direct Comparison of Two RDI Shipboard ADCP's: a 75-kHz Ocean Surveyor and a 150-kHz Narrow Band," Journal of Atmospherica and Oceanic Technology, vol. 20, pp. 872-887 (2002).

Rinehart, Antenna Measurements: Dihedrals, ground targets and antenna beam patterns, AMS Radar Workshop, Jan. 14, 2001.

Roth, et al, Interpreting Graphs as Emergent Competence: A Cultural-Historical Approach. In: Natl Assoc. for Research in Science Teaching, Annual Conf. St. Louis, MO Mar. 26, 2001, http://www.educ.uvic.ca/faculty/mroth/conferences/CONF2001/NARST108.pdf; p. 29, para. 6, p. 30, para.2 (last visited Apr. 18, 2010).

Sato et al, Computer processing for deriving drop-size distributions and vertical air velocities from VHF doppler radar spectra. Radio Science. Sep.-Oct. 1990 vol. 25, No. 5, pp. 961-973; http://www-lab26.kuee.kyoto-u.ac.jp/-tsato/ publ-pdf/rs90b.pdf; p. 962 col. 2 para 5; p. 963 col. 2 para 4; p. 972 col. 1 para 2 (last visited Apr. 17, 2010).

Argonne National Laboratory at http://www.atmos.anl.gov/ABLE/minisodar.html (last visited Nov. 1, 2007).

Atmospheric Research & Technology, LLC at http://www.sodar.com/about_sodar.htm (last visited Nov. 1, 2007).

Atmospheric Systems Corporation at http://www.minisodar.com/public/minisodar/cover.htm (last visited Nov. 1, 2007).

Bristol Industrial and Research Associates Limited a/k/a Biral at http://www.biral.com/met/sodar/2sodars.htm (last visited Nov. 1, 2007).

Bristol Industrial and Research Associates Limited a/k/a Biral at http://www.biral.com/images/met/sodar/2asodarssm.jpg (last visited Nov. 1, 2007).

Bristol Industrial and Research Associates Limited a/k/a Biral at http://www.biral.com/met/sodar/dimensions.htm (last visited Nov. 1, 2007).

Bristol Industrial and Research Associates Limited a/k/a Biral at http://www.biral.com/met/sodar/control.htm (last visited Nov. 1, 2007).

HV Sistemas S.L. at http://www.hvsistemas.es/en/sol/SODAR.html (last visited Nov. 1, 2007).

University of Northern British Columbia at http://cirrus.unbc.ca/images/sm_sodrad.jpg (last visited Nov. 1, 2007).

Wikipedia at http://www.en.wikipedia.org/wiki/Sodar (last visited Nov. 1, 2007).

International Search Report mailed Jul. 15, 2008 in cInternational Search Report mailed/063196; International Filing Date May 9, 2008 First Named Inventor: Niels LaWhite; Applicant File Reference: 16919-00019.

International Preliminary Report on Patentability mailed Nov. 19, 2009 in corresponding PCT Application No. PCT/US2008/063196; International Filing Date May 9, 2008 First Named Inventor: Niels LaWhite; Applicant File Reference: 16919-00019.

International Search Report mailed Jul. 22, 2008, in corresponding PCT Application No. PCT/US2008/064463; International Filing Date: May 22, 2008; First Named Inventor: Niels LaWhite; Applicant File Reference: 16919-00021.

International Preliminary Report on Patentability mailed Dec. 10, 2009, in corresponding PCT Application PCT/US2008/064463; International Filing Date: May 22, 2008 First Named Inventor: Niels LaWhite; Applicant File Reference: 16919-00021.

International Search Report mailed Dec. 16, 2008, in corresponding PCT Application No. PCT/US2008/065222; International Filing Date: May 30, 2008 First Named Inventor: Niels LaWhite; Applicant File Reference: 16919-00026.

International Preliminary Report on Patentability mailed Dec. 10, 2009, n corresponding PCT Application PCT/US2008/065222; International Filing Date: May 30, 2008 First Named Inventor: Niels LaWhite; Applicant File Reference: 16919-00026.

International Search Report mailed Jan. 29, 2009, in corresponding PCT Application No. PCT/US2008/065266; International Filing Date: May 30, 2008 First Named Inventor: Niels LaWhite; Applicant File Reference: 16919-00025.

International Preliminary Report on Patentability mailed Dec. 10, 2009, in corresponding PCT Application PCT/US2008/065266; International Filing Date: May 30, 2008 First Named Inventor: Niels LaWhite; Applicant File Reference: 16919-00025.

International Search Report mailed Apr. 30, 2010, in corresponding PCT Application No. PCT/US2010/026472; International Filing Date: Mar. 8, 2010 First Named Inventor: Elizabeth Walls; Applicant File Reference: 16919-00066.

* cited by examiner

METHOD OF DETECTING AND COMPENSATING FOR PRECIPITATION IN SODAR SYSTEMS

CROSS REFERENCE TO RELATED APPLICATION

This application claims priority of provisional patent application Ser. No. 61/158,589 filed on Mar. 9, 2009. The entire disclosure of the provisional patent application is incorporated herein by reference.

FIELD OF THE INVENTION

The present invention relates to a system for remotely detecting atmospheric phenomena such as wind speed using directed sound waves.

BACKGROUND OF THE INVENTION

Sodar systems employ directed sound waves to detect atmospheric phenomena such as wind speed. By directing sound beams into the atmosphere in a number of directions, and measuring the Doppler shift and intensity of echoes returned from turbulence and discontinuities in the atmosphere, wind speed and other atmospheric phenomena can be accurately estimated. The predominant type of sodar in current use is the monostatic phased array sodar. Monostatic sodar systems emanate sound beams and listen for their reflections from a single location. Phased array monostatic sodars direct the beams in different directions, and are sensitive to echoes returned from these directions, by use of an array of sound transducers which transmit and receive in groups of differing phase so as to direct the transmitted sound beams and regions of sensitivity as desired.

Historically, sodar systems have been used for research into a variety of atmospheric conditions aloft, including wind speed, turbulence, and thermal stratification and stability. Historically, considerable manual analysis and interpretation of sodar data was necessary to extract useful insight into atmospheric conditions.

Present day use of sodar systems is principally focused on the measurement of wind speed aloft, often for the purpose of assessing wind resources at candidate sites for the installation of wind turbines, but also for a variety of other purposes, for example, providing input data to weather prediction models and pollution dispersion studies. In this context the Doppler shift of the returned echo is of principal interest. Present day sodar systems rely heavily on automated detection of this Doppler shift and conversion of the Doppler shift information into radial, vertical and horizontal wind velocities. Prior art relies on relatively simple statistical methods for automatically determining a single Doppler shift in each of the several beam directions. At best, prior art methods identify periods of strong downward velocity indication as likely related to precipitation. In prior art, standard practice when collecting sodar data is to omit data during times of precipitation. This approach is not ideal since a potentially large percentage of the data acquired could be lost.

The simple statistical methods used in prior art fail to take full advantage of the spectral information available in the returned signals. The returned sound signals from the atmosphere are not simple signals with a single, clear, sharp response in the frequency domain. The response spectrum may contain multiple peaks: a peak associated with air velocity; a peak associated with fixed echoes; and a peak reflected off of rain and other precipitation. Distinguishing, separating and individually measuring these multiple peaks provides means of providing the sodar user with useful additional information as compared to prior art techniques.

SUMMARY OF THE INVENTION

The invention comprises a method for automatically detecting the spectral peaks in a returned signal from the atmosphere in a phased array monostatic sodar device. A non-limiting example of a sodar system with which the invention may be used is disclosed in U.S. patent application Ser. No. 11/934,915, filed Nov. 5, 2007, entitled "Transducer Array Arrangement and Operation for Sodar Applications", the disclosure of which is incorporated by reference herein in its entirety. Rather than assuming that the returned signal contains a single spectral peak, the inventive method accounts for the possibility that there may be two or more Doppler-shifted spectral peaks in the returned signal. One peak is expected reflected off of turbulence in the air itself, and associated with the velocity of the air itself. Another peak may be detected reflected off of any precipitation in the air mass, and associated with the velocity of this precipitation.

The inventive method automatically detects when multiple peaks exist in a returned spectrum. When multiple peaks are detected, the method separates the spectrum into a precipitation-related region of response frequencies and a wind velocity-related region of response frequencies. Individual estimations are made of the peak frequencies within each of these spectral regions. Characteristics of these peaks are used to estimate the presence and severity of precipitation, which can be used to more accurately estimate the wind velocity than would otherwise be possible in the presence of precipitation, and to estimate the degree to which precipitation has unavoidably degraded the accuracy of the wind estimate.

This invention features a method of detecting precipitation with a sodar apparatus that transmits sound beams into the atmosphere, detects echoes returned from the atmosphere, from the echoes determines a Doppler-shifted spectrum comprising the relative strength of the echoes at various Doppler-shifted frequencies, and estimates wind speed and direction. In one embodiment the inventive method comprises automatically estimating the presence of precipitation based on the Doppler-shifted spectrum. Automatically estimating the presence of precipitation may comprise automatically distinguishing a frequency or frequency range in the Doppler-shifted spectrum that is associated with wind velocity from a frequency or frequency range in the Doppler-shifted spectrum that is associated with precipitation.

In one embodiment the invention may further comprise using the estimated presence of precipitation to automatically improve the accuracy of the wind speed estimate made in the presence of the rain. This method may further comprise automatically estimating the severity of rain based on the Doppler-shifted spectrum. The rain severity estimates may be used to more accurately determine when the presence of rain has degraded the reliability of a wind estimate.

Automatically distinguishing a frequency or frequency range in the Doppler-shifted spectrum that is associated with wind velocity from a frequency or frequency range in the Doppler-shifted spectrum that is associated with precipitation may be accomplished by automatically identifying two distinct peaks in the Doppler shifted spectrum, one such peak being associated with rain velocity and the other being associated with wind velocity. This method may further comprise automatically determining the predominant frequency of each peak individually, and may further comprise automatically determining when the peaks are not sufficiently distinct to accurately estimate wind speed as a determination of reliability. The spectra of a number of samples in an averaging period may be used to make the wind speed estimate and the determination of reliability.

Identifying two distinct peaks may be accomplished by applying a curve fit to the averaged spectra. The curve fit may be a higher order polynomial curve fit of the logarithm of the spectrum; the higher order polynomial may be an octic, or eighth-order polynomial. Quadratic curves may be fit to the peaks of the higher order polynomial, and the quadratic curves may subsequently be used to generate two Gaussian curves, one representing the region of the spectrum associated with precipitation and the other representing the region of the spectrum associated with wind velocity. Automatically identifying two distinct peaks in the Doppler shifted spectrum may include finding an inflection point on the spectrum, and treating that as the second peak. Treating the inflection point as a second peak may comprise altering the spectrum by adding to the polynomial a term that increases or decreases with frequency, so as to change a local inflection point into a local maximum such that the resulting polynomial has two maxima Automatically identifying two distinct peaks in the Doppler-shifted spectrum may comprise automatically eliminating one or more excess peaks if there are more than two peaks. Automatically eliminating one or more excess peaks if there are more than two peaks may comprise discarding the lowest frequency peak if it has the lowest amplitude of the peaks, and/or discarding all peaks except the two with the greatest amplitudes.

Properties of the two peaks may be used to estimate the severity of rain, to more accurately estimate the wind speed in the presence of precipitation by limiting the section of the spectrum analyzed to estimate wind speed to that part of the spectrum likely due to wind alone and not due to precipitation, and to estimate the degree to which precipitation is degrading the accuracy of the estimate of wind speed. A fuzzy logic technique may be used to make the estimates of the presence of precipitation, to limit the section of the spectrum analyzed and to estimate the degradation in wind speed accuracy.

BRIEF DESCRIPTION OF THE DRAWINGS

Various other objects, features and advantages of the present invention will become fully appreciated as the invention becomes better understood when considered in conjunction with the accompanying drawings, in which like reference characters designate the same or similar parts throughout the several views, and wherein.

DETAILED DESCRIPTION OF EMBODIMENTS OF THE INVENTION

Figure 1:
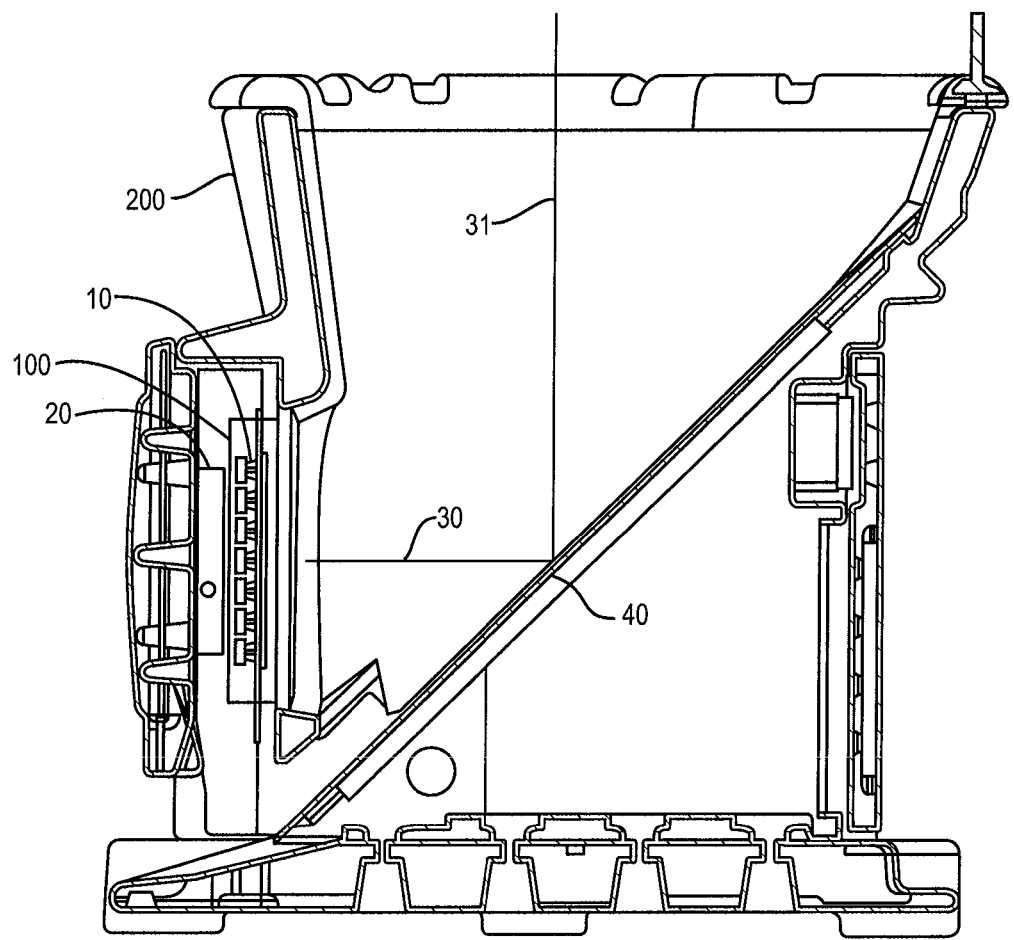
FIG. 1 is a sectioned view of a sodar apparatus with which the invention can be used.

The inventive method can be used with a sodar apparatus as shown in FIG. 1. However, the method can also be used with other types of monostatic and bistatic sodar devices. The phased array monostatic sodar apparatus shown in FIG. 1 consists of an array 100 of individual acoustic transducers 10. The transducers 10 are connected to an electronics and data processing system 20 which causes them to emit phased array beams of sound 30 in the generally horizontal direction as shown. These beams impinge upon a solid smooth surface, the 'sound mirror' or 'mirror' 40 which causes the sound beams to be reflected generally upwards as reflected beams 31.

The reflected sound beams 31 impinge upon turbulence and density variations in the atmosphere above. Some of the sound energy from these beams is reflected back along the same paths as outbound beams 31 and 30, returning to the transducers 10 in phased array 100 where they are detected by receiving components of the electronics package 20. These components are mounted in housing 200 which supports the various components, and which may also serve to block stray sound transmission and reception from undesired directions.

In order for a sodar apparatus to measure wind speed and direction in the presence of precipitation, it is obviously a necessary condition that the array 100 of transducers 10 be adequately protected from any precipitation which might permanently damage them or temporarily interfere with their operation. The method described above wherein the array 100 is protected from the elements by housing 200, and in which mirror 40 is used to reflect the sound beams from the generally horizontal path 30 along which they are emitted from the array into the generally vertical path 31, is one non-limiting means of obtaining such protection, known in prior art. Other means of protecting the array 100 from damage due to precipitation, and rendering it operable in the presence of precipitation may be possible, and the invention would be equally applicable to such other means.

Figure 2:
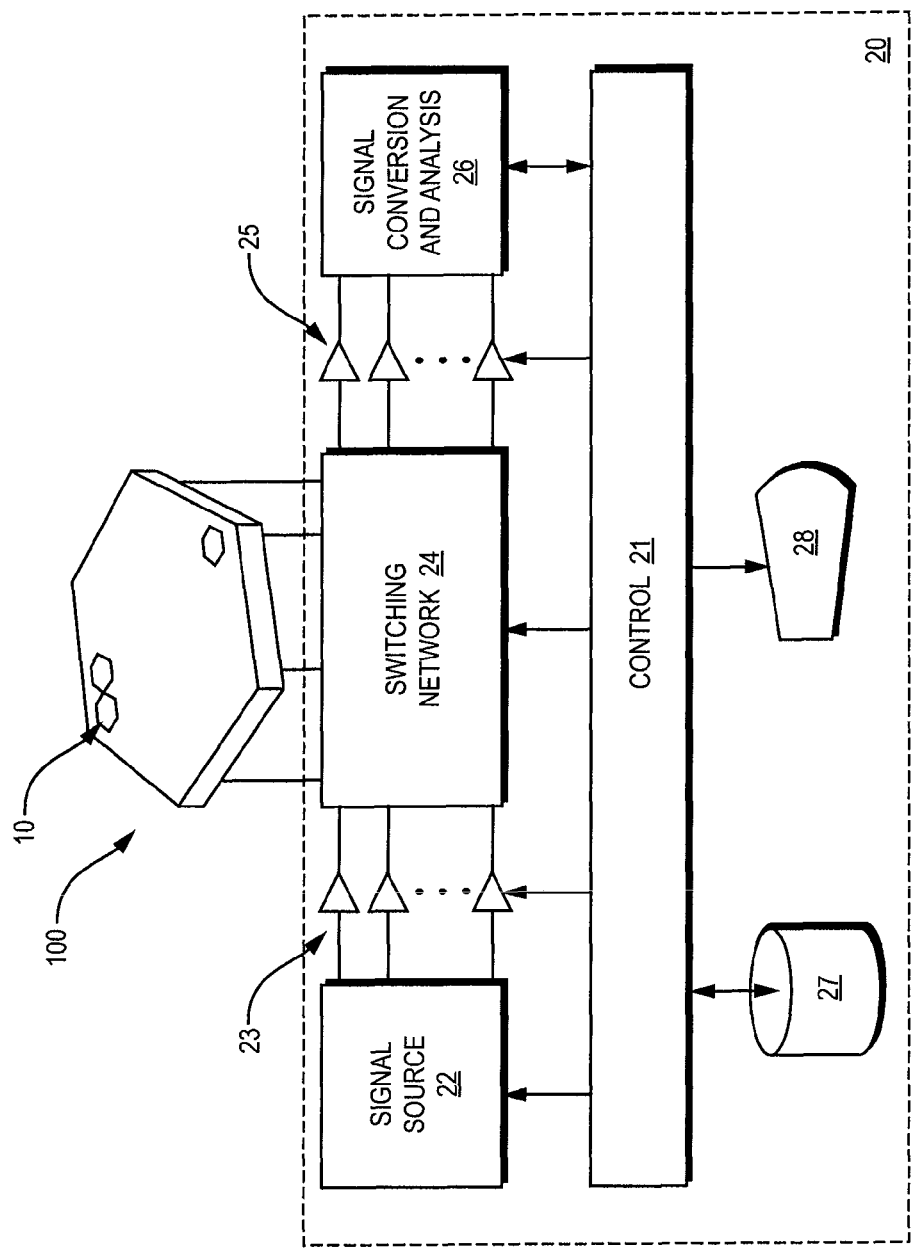
FIG. 2 is a block diagram of the principal signal processing components in a sodar apparatus with which the invention can be used.

The transducers 10 in array 100 are driven in transmit mode, and returning sound is detected and evaluated in receive mode, by electronics equipment 20. FIG. 2 shows one non-limiting example of electronic equipment 20 in greater detail in block diagram form. Operation of the system consists of a series of "shots." Each shot consists of an initial period where the electronics are configured to transmit a sound signal into the air, and a second immediately following period during which the electronics are configured to receive, analyze, and record incoming signals, in particular the echoes of the transmitted signal reflected back from the environment. The inventive method comprises processing and analysis of the incoming signals during this second period of the shot.

The components shown in FIG. 2 consist of hardware and software elements the function of which can be implemented in a variety of ways as would be apparent to one skilled in the art, each of which is within the scope of the invention. Despite this, most monostatic phased array sodar electronics systems will consist of the elements shown in FIG. 2, whether these elements are accomplished by physical electronic hardware, programs within control and signal processing computers, or, as is typical for modern sodar apparatus, a combination of the two.

In operation the control component 21 will configure the switching network 24 so as to connect transducers 10 of array 100 to signal source 22 through transmit amplifiers 23. Signal source 22 will provide signals appropriately phased for each of the transducers 10 so as to cause array 100 to transmit a focused beam of sound 31 in a particular generally upward direction; this aspect is set forth in more detail in the application incorporated herein by reference. Immediately following this transmission, control component 21 will configure switching network 24 so as to connect the transducers 10 of array 100 to signal conversion and analysis component 26 through receive amplifiers 25. This receive mode configuration is set, using phased array techniques, to maximize sensitivity in the same direction as that in which beam 31 was transmitted. Conversion and analysis component 26 analyzes the spectral properties of the returned echoes in order to estimate atmospheric properties at various altitudes above the apparatus as will be further described below. This analysis process is involved in the invention. After the received data is analyzed, it may be stored using some storage element 27, transmitted, reported or displayed for the user using reporting means 28 or, most usefully, both.

The sodar apparatus is only sensitive to air velocity in the radial direction of beam 31. There is no direct means of estimating horizontal wind velocity or direction from a single shot in a single direction. Accordingly controlling component 21 is configured so as to sequentially adjust the transmitted direction of beam 31 and the direction of maximized sensitivity to returned echoes. At least three beam directions are necessary to resolve horizontal wind speed, horizontal wind direction, and vertical wind speed. In the apparatus described in the application that is incorporated herein by reference to which the inventive technique has been applied, the apparatus transmits three beams inclined at approximately 11 degrees from vertical in three directions separated by 120 degrees of azimuth. Equivalently the technique could be applied to other sodar apparatus that transmit beams in multiple directions, for example where a single beam is transmitted more exactly vertically, and the second and third beam directions are inclined (e.g., approximately 15 degrees) from the vertical and separated from each other by approximately 90 degrees in azimuth. By transmitting beams in three different directions, and estimating radial velocities in three different directions, vector analysis techniques can be applied to extract the horizontal speed and direction which is of greatest interest. The invention can also be applied to bistatic sodar systems, in which separate transmitters and receivers are used.

The data from any individual shot is likely to be contaminated with noise. Also, at any particular altitude of interest there is no guarantee that the signal of interest will be of sufficient strength relative to the noise to be useful, or indeed to be detected at all. Accordingly, sodar systems generally do not report near-instantaneous conditions based on a single group of three shots, which could be completed in roughly 6 seconds. Instead sodar systems typically estimate atmospheric conditions based on an average of a number of shots in each of the three directions. For example, data might be averaged over a 10 minute interval, consisting of approximately 100 shots in each of the three directions.

Figure 3:
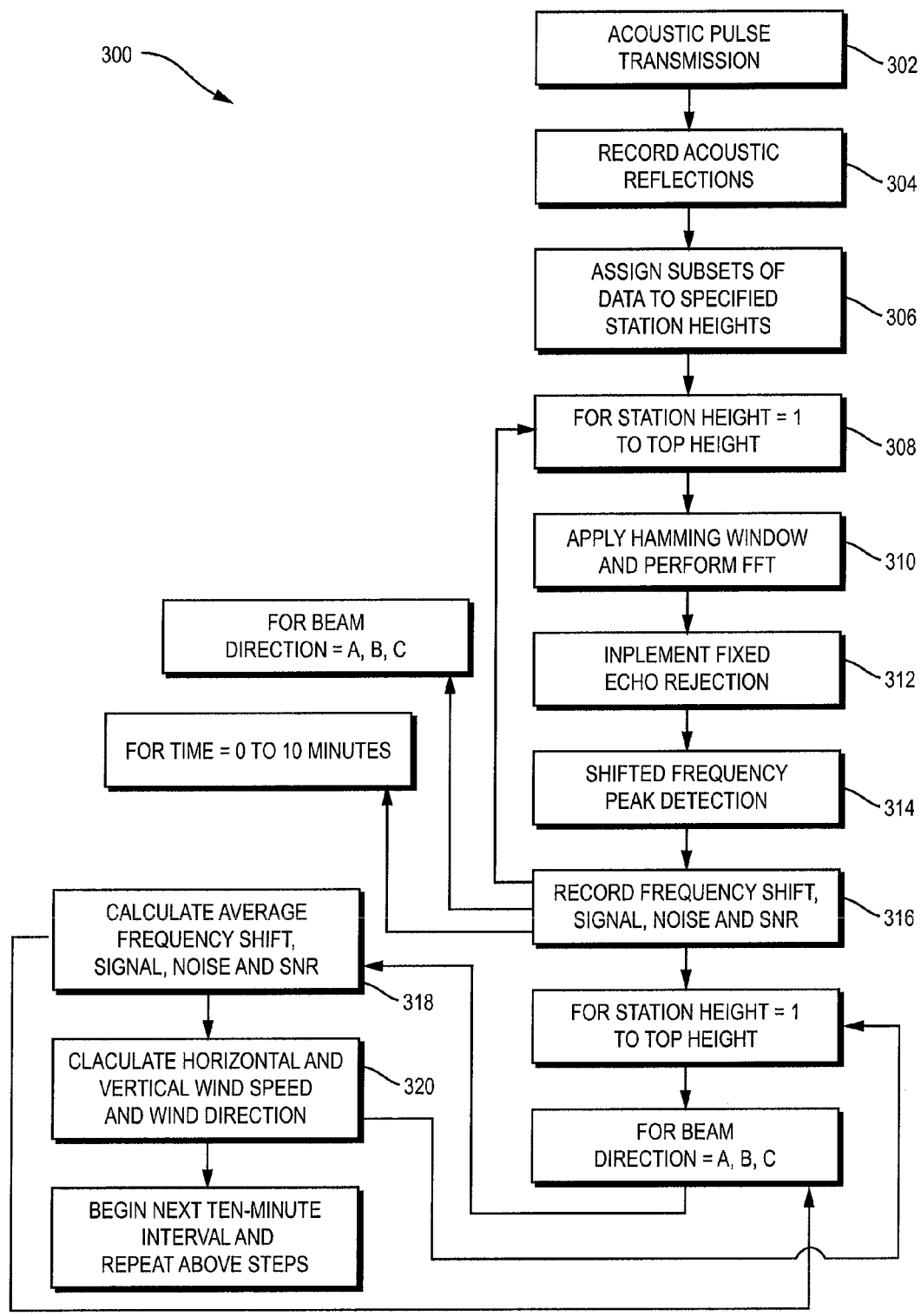
FIG. 3 shows in general terms the principal steps involved in processing the data from a sodar apparatus using typical prior art techniques, without precipitation detection.

FIG. 3 shows the typical prior-art overall processing technique 300 for a sodar system not using the inventive methodology in greater detail in flow chart form. Sodar data is processed in blocks of (for example) ten minutes. During this period shots are repeated in each of three beam directions. As described above, for each direction, a directional acoustic pulse, or beam 31, is transmitted, step 302, and subsequently the apparatus is configured to record the echoes, or acoustic reflections, from the environment, step 304.

Time of travel of the beam 31 to a particular altitude, and in turn the time of travel for any echo from that altitude to be returned to the apparatus, depends on the altitude and the speed of sound. Accordingly the returned signal can be broken up, or windowed, into segments associated with atmospheric conditions at different altitudes above the apparatus, steps 306-310, this being a useful characteristic of sodar apparatus known to those skilled in the art.

Subsequently, a Fast Fourier Transform is applied to this windowed data, step 310, to convert the time-series signal into the frequency domain so that Doppler shifts of the returned signals can be measured. For reasons known to those skilled in the art of such conversions, more accurate frequency spectra without artifacts of the windowing process will be obtained if some form of gradual windowing, for example a Hamming Window, is applied to the data than would be the case if abrupt or "boxcar" windowing were applied to the data. For reasons known to those skilled in the art of such conversions, more points and more efficient computation are obtained of the frequency spectra if the windowed data is augmented with a series of zeros sufficient to make the total length to be transformed equal to a power of 2, such as 1024.

The character of the resulting spectrum for an individual shot at a particular elevation can be summarized as a Doppler frequency shift, step 314, a signal level, and a signal-to-noise ratio (SNR), step 316, the methods for making this summary data being apparent to those skilled in the art. Techniques known to those skilled in the art can be used to eliminate the effect of zero-Doppler shift echoes returning from fixed objects, step 312.

Finally, after 10 minutes have elapsed, average spectra can be computed for each beam direction at each elevation, step 318. The individual frequency shifts for the individual shots used in a particular average may be weighted in the average based on signal strength, noise strength, and SNR using techniques apparent to those skilled in the art. The average frequency shifts can be used to compute horizontal wind speed, direction, and vertical wind speed using methods apparent to those skilled in the art, step 320.

Figure 4A:
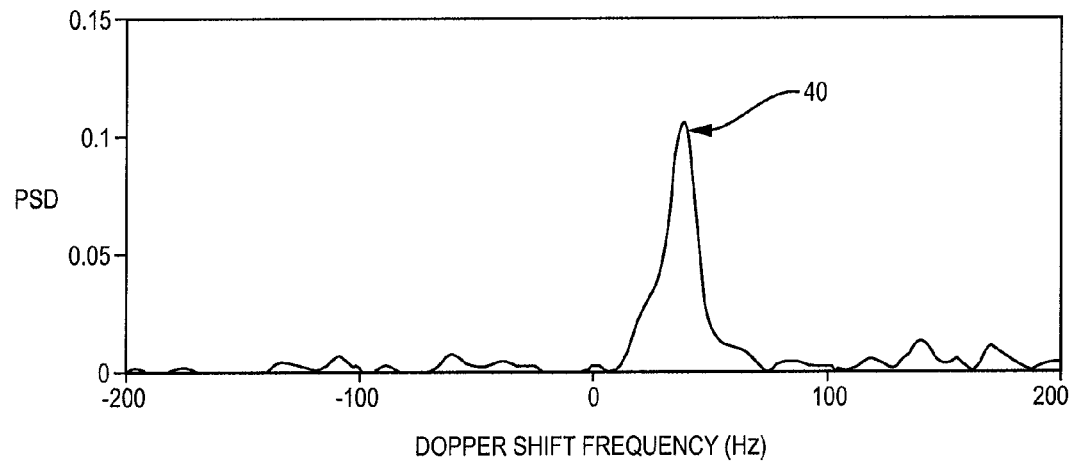
FIG. 4A shows a typical spectral response from a sodar apparatus without the presence of any precipitation.
Figure 4B:
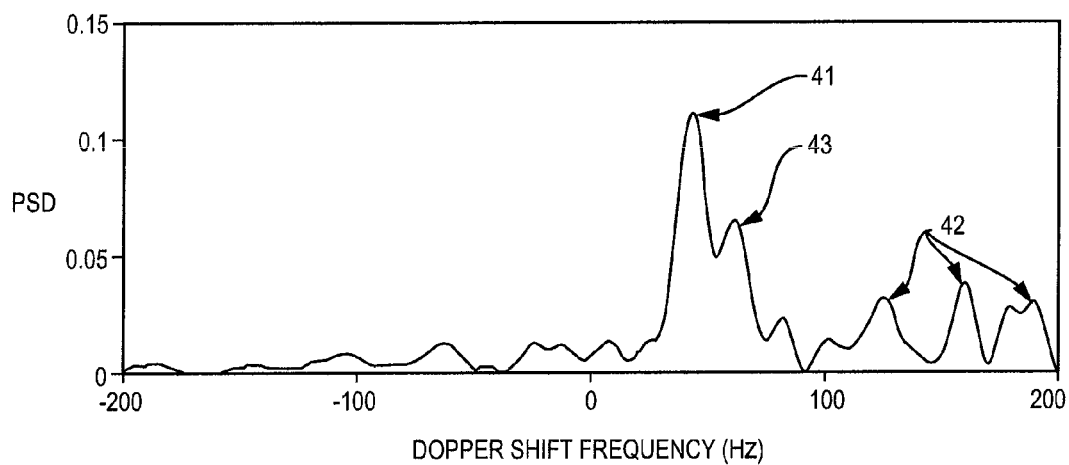
FIG. 4B shows a typical spectral response from a sodar apparatus operating in the presence of light precipitation.
Figure 4C:
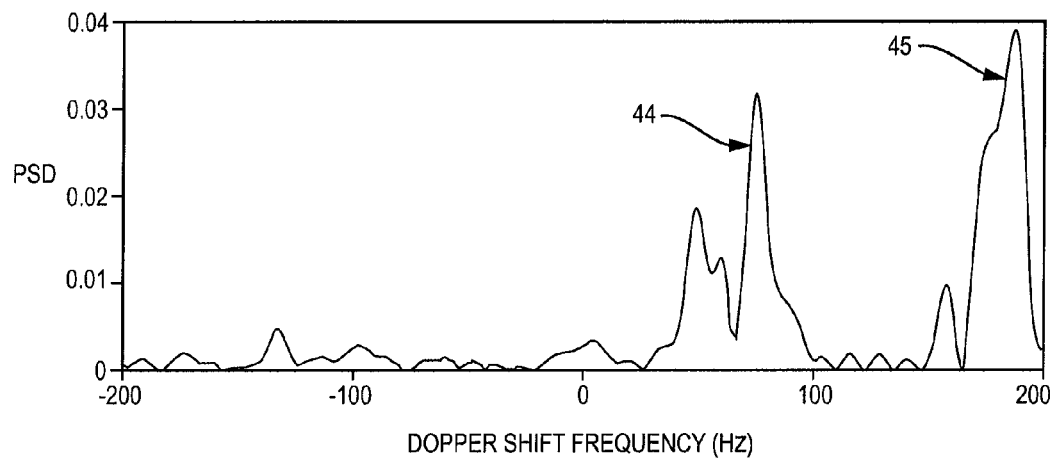
FIG. 4C shows a typical spectral response from a sodar apparatus operating in the presence of moderate precipitation.
Figure 4D:
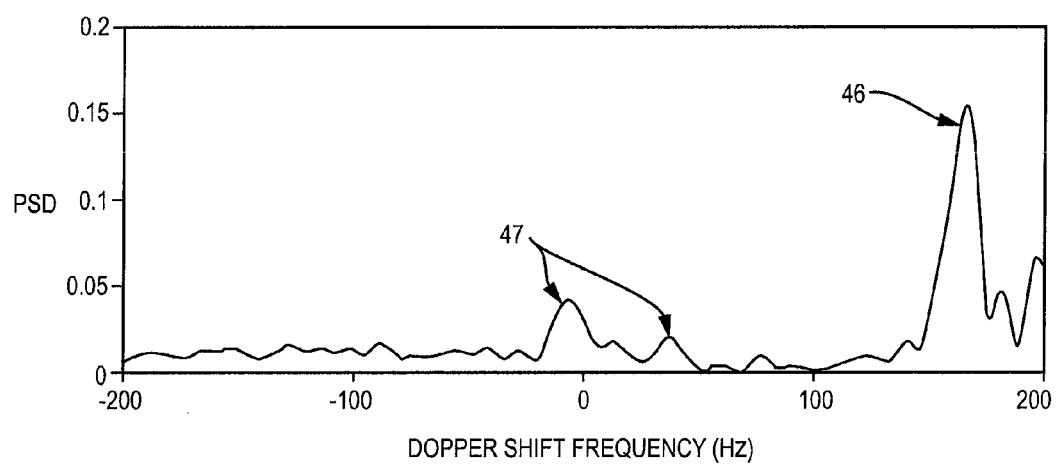
FIG. 4D shows a typical spectral response from a sodar apparatus operating in the presence of heavy precipitation.

The above technique works well during periods of no precipitation. FIG. 4A shows a spectrum from an individual shot under conditions without precipitation. A clear spectral peak 40 Doppler shifted due to wind velocity is visible. At increasing levels of precipitation, the vertical velocity of the rain drops begins to affect the spectra. In FIG. 4B (light rain) a fairly clear wind related peak 41 is still visible. Light precipitation introduces additional small peaks 42 likely related to rain drop velocity. Peak 43 may be related to wind or may be precipitation, and affects confidence in, and perhaps accuracy of, any wind velocity estimate. In FIG. 4C (moderate rain), the group of peaks 44 are wind related, while the group of peaks 45 are rain-related. In this case, with peak 44 clearly visible, the wind data is not lost from the spectrum, but standard signal processing techniques will likely choose peak 45 as the shifted spectrum for wind estimate, introducing significant error in the wind velocity estimate. In FIG. 4D (heavy rain), peak 46 associated with rain dominates heavily, and it may not be possible to accurately estimate a wind speed from the group of peaks 47.

Current state of the art sodars will report erroneous strong downward vertical velocities in the presence of rain. Operators skilled in the art of interpreting sodar data use such strong vertical downward velocities as indication that rain is present and that the horizontal velocity and direction reported by the sodar is likely inaccurate and should be discarded.

From the foregoing it will be clear that a method of identifying precipitation-related Doppler shift peaks, distinguishing such peaks, and separating them from purely wind-related peaks, will provide a means of extracting wind data of useful accuracy in the presence of light and moderate rain, and an automated means of rejecting data when rain is so severe as to irreparably compromise the wind speed estimate will provide a means to discard erroneous wind data collected in heavy rain.

Figure 5:
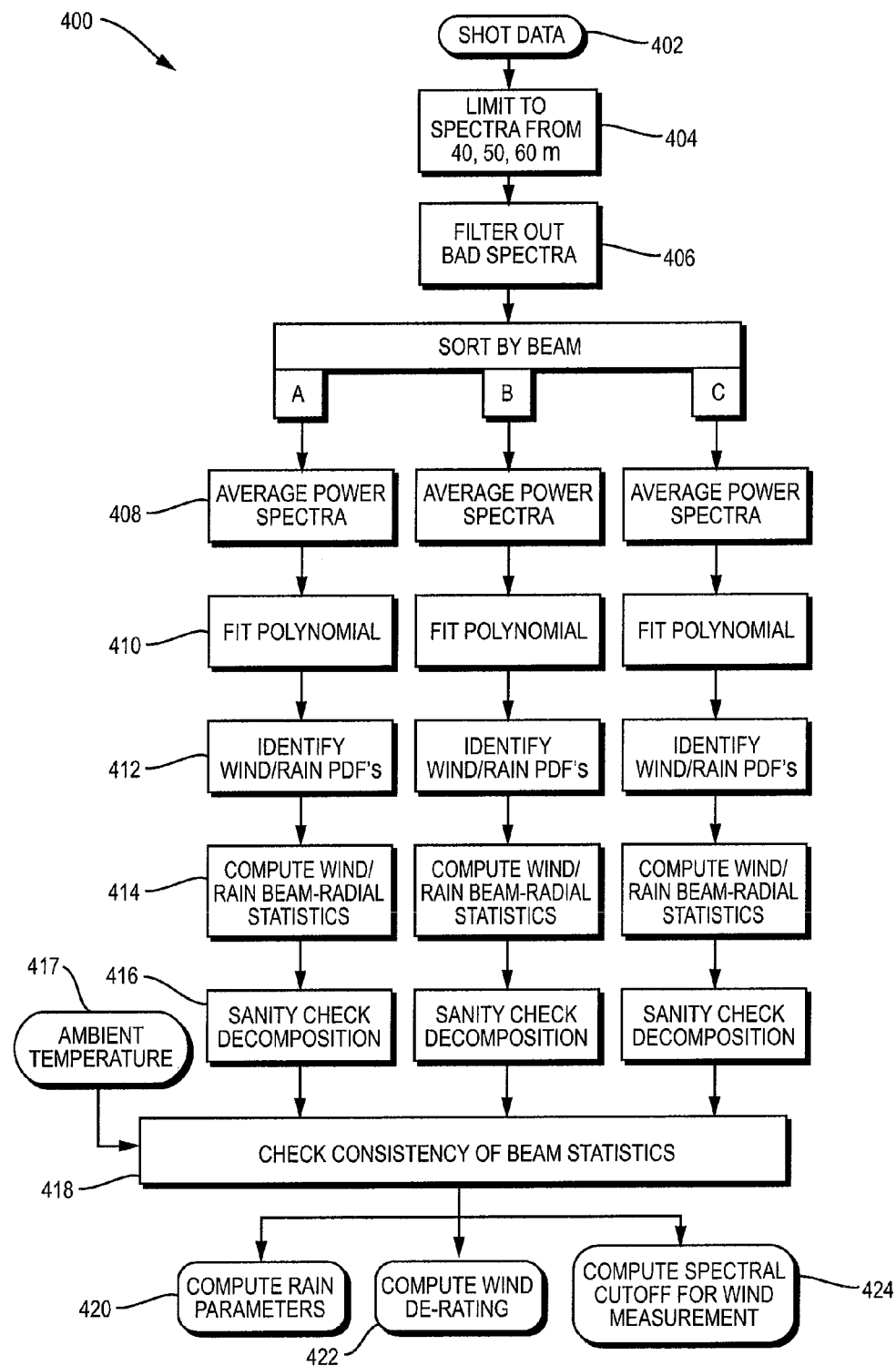
FIG. 5 shows certain steps of the preferred embodiment of the inventive method to detect the presence of precipitation and to isolate the portions of the spectrum related to precipitation and to wind.

FIG. 5 illustrates and describes the basic steps involved in the preferred embodiment of the inventive method 400 of detecting and isolating the Doppler shifts related to rain.

Over the 200 (more or less) meter range of altitudes under which modern phased array monostatic sodars typically operate, rain, if present, is likely generally uniform over the entire vertical column being measured. Accordingly it is sufficient to estimate rain fall at only one or a few altitudes, and use the estimate of rain at those altitudes as a proxy for rain at all altitudes. This is useful since it is easier to detect the rain-related spectral components and isolate them from wind-related components at lower altitudes, such as for example, 40, 50 and 60 meters, where the signals from wind and rain are stronger and less masked by random noise and the like than the signals returning from higher altitudes. Thus, shot data 402 from only one or more of relatively low altitudes, step 404, is used in the preferred embodiment.

The inventive method discounts or discards (filters) spectrum samples which have Signal to Noise Ratios (SNR, calculated as the ratio of energy in spectral peaks to broadband energy) below some limit, step 406. As one non-limiting example of this, the SNR is the average PSD in the vicinity of the main peak divided by the average PSD everywhere else. This is typically expressed in dB, by taking SNR=10*log (AveMain/(AveElsewhere/Normalization)) where the normalization=(Total Spectral Bandwidth−Width of Hamming Window)/Width of Hamming Window. It has been found that an appropriate SNR filter for the rain filter passes only shots with SNR>7 dB.

Figure 8A:
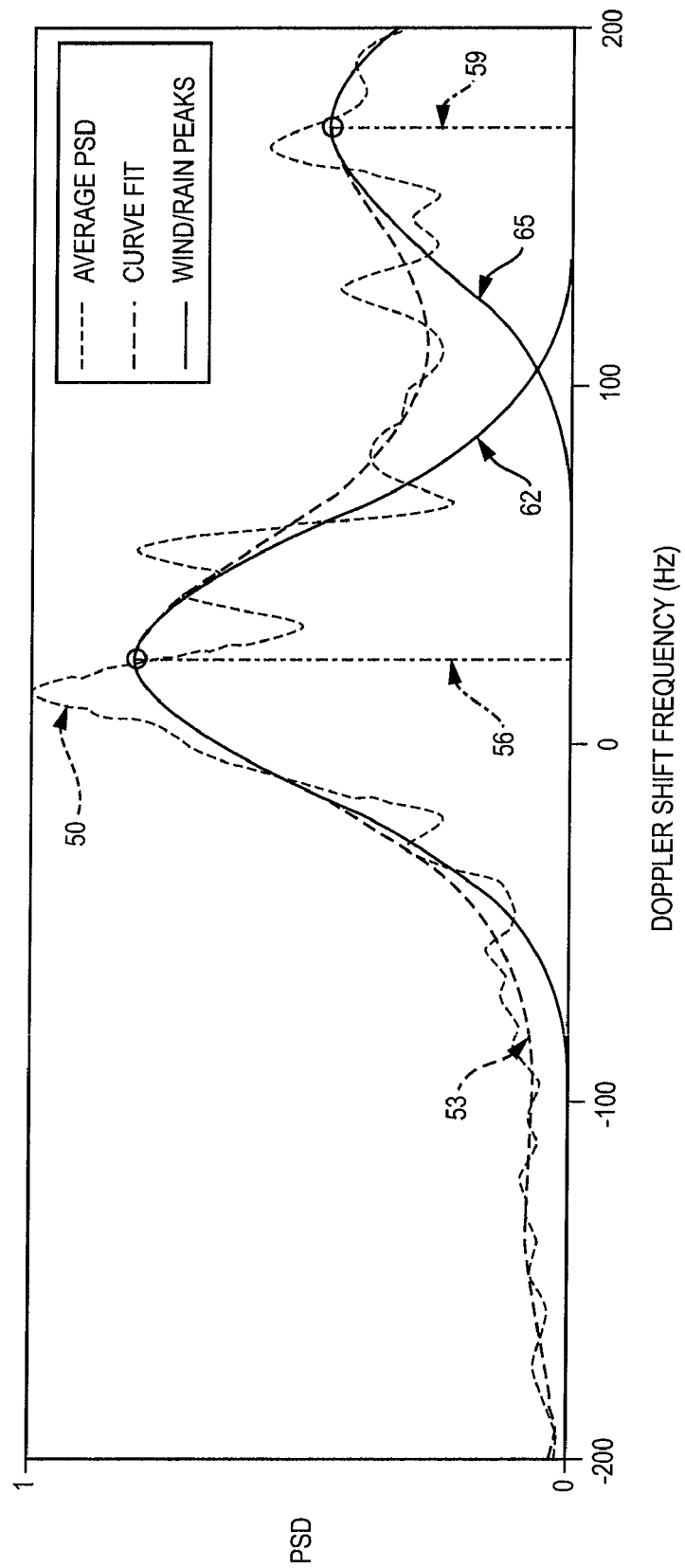
FIGS. 8A, 8B, and 8C show exemplary spectra from each of the three beams with the preferred embodiment of the inventive method applied.
Figure 8B:
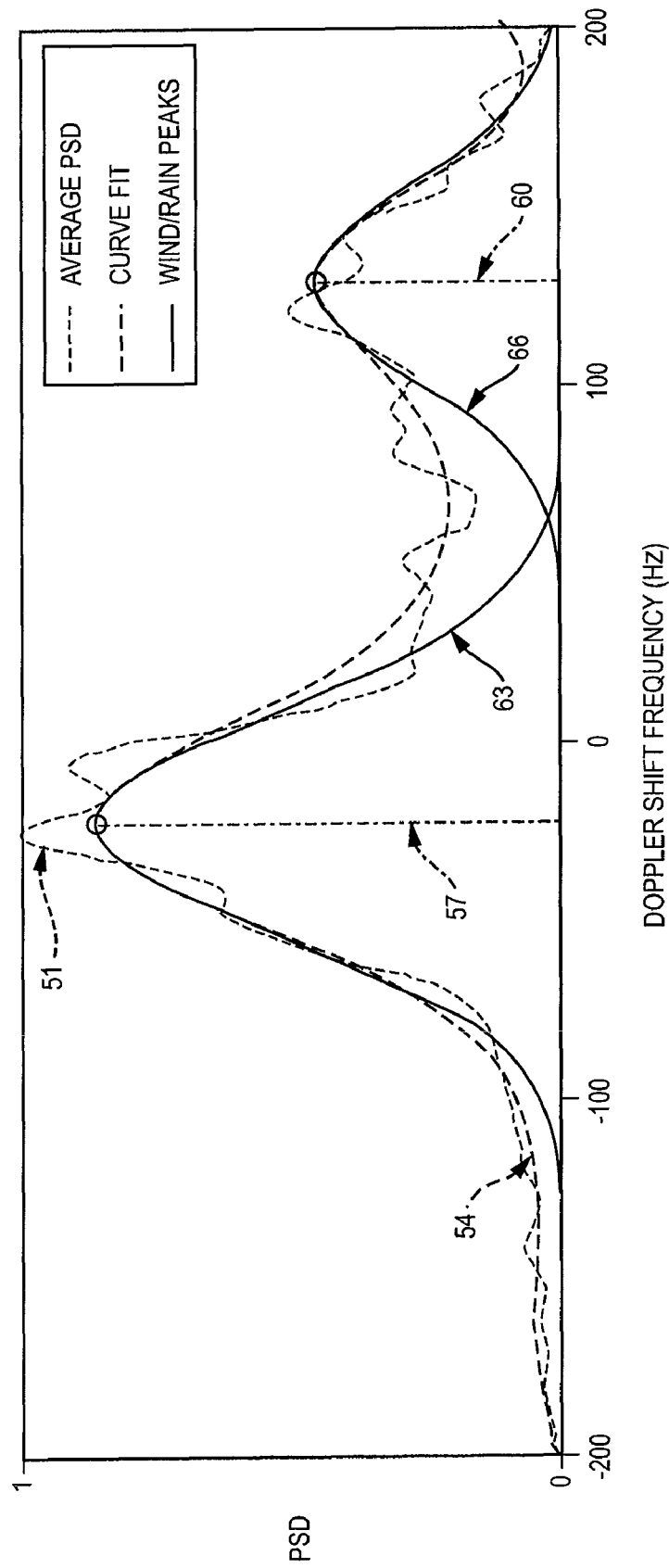
Figure 8C:
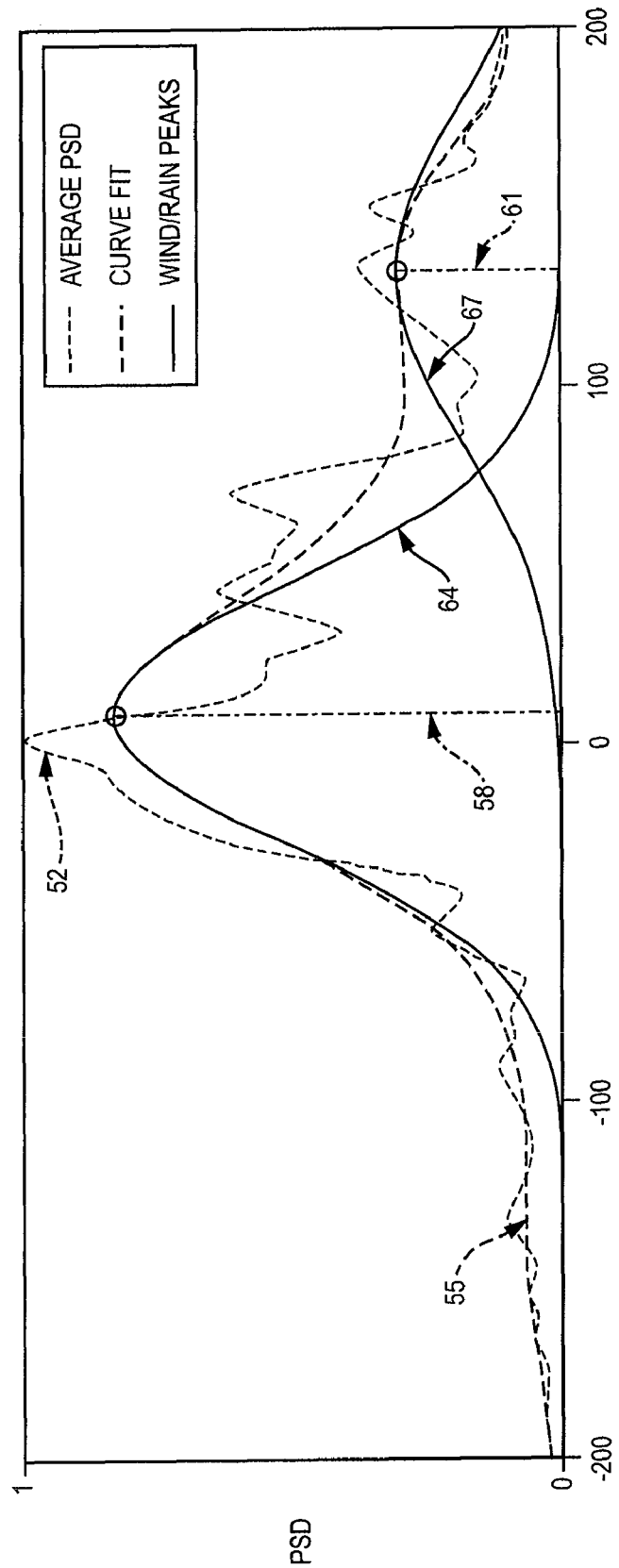

For each beam direction (the steps are the same for each of the three beam directions and so will be described for only one direction) the presumptively reliable of the remaining spectra are averaged into a preliminary average, step 408. A spectrum is regarded as unreliable if its peaks are at significantly different amplitude from the predominant peak amplitude of the data set as indicated by the preliminary average. If such an unreliable peak is significantly larger than the average, it might adversely affect the accuracy of rain detection. Accordingly, spectra with peaks significantly larger than the peak of the preliminary average are discarded. As a non-limiting example the method might discard raw spectra which have peak amplitudes greater than five times the amplitude of the rough average peak. After discarding these unreliable sample spectra, a final average is calculated using the remaining spectra. Curves 50, 51 and 52, shown as dotted lines in FIGS. 8A, 8B and 8C respectively, are examples of these final average spectra.

To automatically identify the peak associated with wind, and the separate peak associated with rain (if present), it is computationally more convenient to approximate the spectrum, which represents a stochastic measurement of the real world, with a curve fit to some mathematical function, step 410. However, the invention also contemplates peak identification directly from the averaged spectra. A non-limiting example curve fit which works well is to take the natural logarithm of the spectrum and fit this to an octic, or eighth order polynomial function. The use of the natural logarithm being useful for reasons discussed below. Curves 53, 54, and 55, shown as dashed lines in FIGS. 8A, 8B and 8C, respectively are examples of such curve fits.

Once the curve fits are available the one or two peaks can be identified as the point(s) where the octic curve's derivative with respect to frequency is zero and the second derivative is less than zero. The higher frequency peak is always associated with rain, since the rain drops are falling through the air mass and as a result have a greater up-frequency Doppler shift than the peaks associated with the velocity of the air itself. Vertical dash-dot lines 56, 57, and 58 in FIGS. 8A, 8B and 8C, respectively are associated with the wind speed peak, while vertical dash-dot lines 59, 60 and 61 in FIGS. 8A, 8B and 8C, respectively are associated with the rain peaks.

In unusual instances, there may be more than or fewer than two peaks. In the case of an octic curve fit, there may be one, three or four, instead of two peaks. Subsequent processing depends upon selecting which two peaks correspond with wind and rain. The inventive method preferably includes an automatic means for selecting which two peaks to use if more than two peaks are present based on knowledge of the spectral properties of returned sodar signals. For a non-limiting example, in one method of eliminating excessive peaks, the following rules may be used: (a) if there are three peaks and the lowest frequency peak is also the lowest amplitude, then that peak is discarded; (b) if there are three peaks and the lowest frequency peak is not the largest and is significantly lower in frequency than the next higher frequency peak, then that peak is discarded; (c) if there are three or more peaks, and neither steps (a) or (b) eliminated a peak, then all but the largest two peaks are discarded.

It is also helpful to provide a means of automatically finding a point to serve as a second peak even if only one true maximum is found. For a non-limiting example, a means of finding the most prominent inflection point on the spectrum, and treating that as the second peak can be employed. For non-limiting example, the spectrum can be "tilted" by adding to the octic polynomial a term that increases or decreases with frequency; in one non-limiting embodiment the increase or decrease can be linear. This term has the effect of changing a local inflection point into a local maximum, such that the resulting polynomial has two maxima for subsequent processing.

These individual peaks can be accurately modeled as Gaussian curves, using the following method which takes advantage of the use of fitting the octic curve to the logarithm of the spectrum as discussed above. The Gaussian curve is the exponential of a quadratic curve. It is possible to fit a quadratic curve to each of the two chosen peaks of the octic curve by calculating a quadratic whose value, first derivative, and second derivative matches those of the octic at the point of the peak. The Gaussian curves based on the lower frequency quadratic expressions corresponding to wind are shown as solid lines 62, 63 and 64 in FIGS. 8A-8C, respectively. The curves based on the higher frequency quadratic expressions corresponding to rain are shown as solid lines 65, 66 and 67 in FIGS. 8A-8C, respectively.

These Gaussian curves can be interpreted as Probability Density Functions (PDFs), step 412. The lower frequency PDF corresponds to wind, and the amplitude of that curve at any particular frequency corresponds to the probability that spectral energy at that frequency is associated with wind. Conversely, the higher frequency PDF corresponds to rain, and the amplitude of that curve at any particular frequency corresponds to the probability that spectral energy at that frequency is associated with rain.

From the shape of these Gaussian curves taken over an interval of time for the three beam directions, at one or more elevations, it is possible to determine the likelihood that rain is present, and the likely intensity of that rain. Additionally, and most importantly for the accurate estimation of wind speed which may be the primary use of the invention for a sodar apparatus, it is possible to establish boundaries surrounding the wind peak in the spectrum within which wind data is unlikely to be corrupted by the presence of rain, or in other words, to select a modified spectral bandwidth for estimation of the wind frequency peaks and also to provide a measure of confidence in the degree to which the wind speed is accurately estimated in spite of the possible presence of precipitation.

As non-limiting examples, the separation between the peaks of the two Gaussian curves, the ratio of the heights of these two curves, the width of each curve to the half-amplitude level, and the amplitude of the point at which these two curves intercept each other may be chosen as relevant and automatically calculable measures of the shape of Gaussian curves.

As would be apparent to one skilled in the art of signal processing, a set of fuzzy logic rules may be applied to the measures of the Gaussian curves so as to compute wind and rain beam-radial velocity statistics, step 414. In particular, a spectral cutoff, or in other words modified spectral limits, for wind measurement, step 424; a confidence factor for the wind radial velocity; a measure of precipitation droplet speed, intensity and type; and a confidence factor for these measures of precipitation state may be computed. Fuzzy logic rules are an effective way to determine spectral cutoffs, but the inventive method can be accomplished without the use of fuzzy logic.

Further fuzzy logic rules may be used to check that these results are reasonable, in other words to check that they pass a sanity check, step 416. Further, the information from the three radial directions can be combined to check that the calculated statistics for the three beams are consistent with one another, step 418. Temperature can be taken into account, as would be apparent to one skilled in the art, step 417.

A non-limiting example of appropriate fuzzy rules and their application is as follows. See FIGS. 6A-6L. The five rules shown in FIGS. 6A-6E (rule for number of good shots, rule for frequency of main wind peak, rule for frequency of rain peak, rule for separation between peaks, and rule for width of peaks, respectively) are used on a per-beam, per-height basis, for example, for each of the A, B, C beams and at each of the 40 m, 50 m, and 60 m heights.

Note that the fifth rule (FIG. 6E) is applied twice, once for the wind peak width, and once for the rain peak width. This rule is only applied if the peak being tested is at least ¼ as big as the other peak, so if a peak is relatively small, the width rule is not used on it.

The overall fuzzy truth value is found by taking the minimum of the truth values found from each of the rules. This is the fuzzy AND operation. Rule 1 must be true, AND rule 2 must be true, AND rule 3 must be true, etc. Compute the truth value from each rule, take the minimum, and use that as a rating for the confidence in the present rain/wind decomposition.

As there are three beams and three heights in this example, this results in nine decompositions have nine different truth values.

Next the A, B, and C beam decompositions at a single height are combined. A combined truth factor for the A, B, C set is formed, using more fuzzy rules.

Figure 6A:
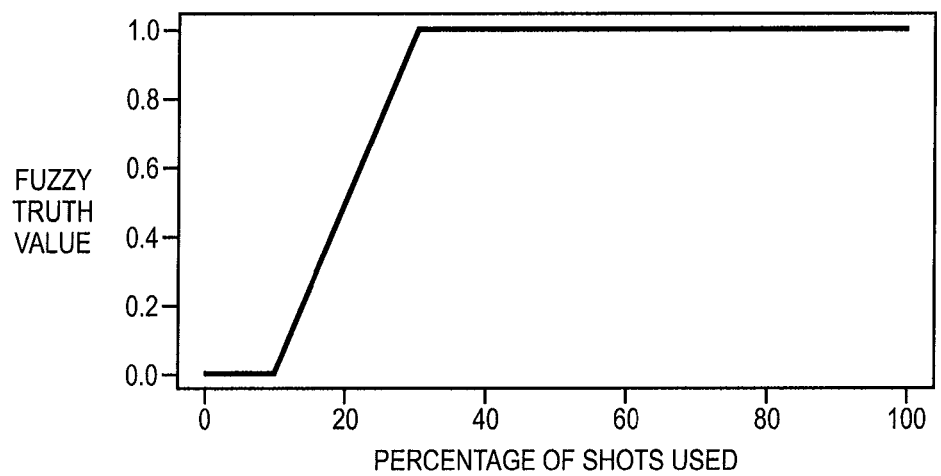
FIGS. 6A-6L illustrate examples of fuzzy rules that are used in an embodiment of the invention.
Figure 6B:
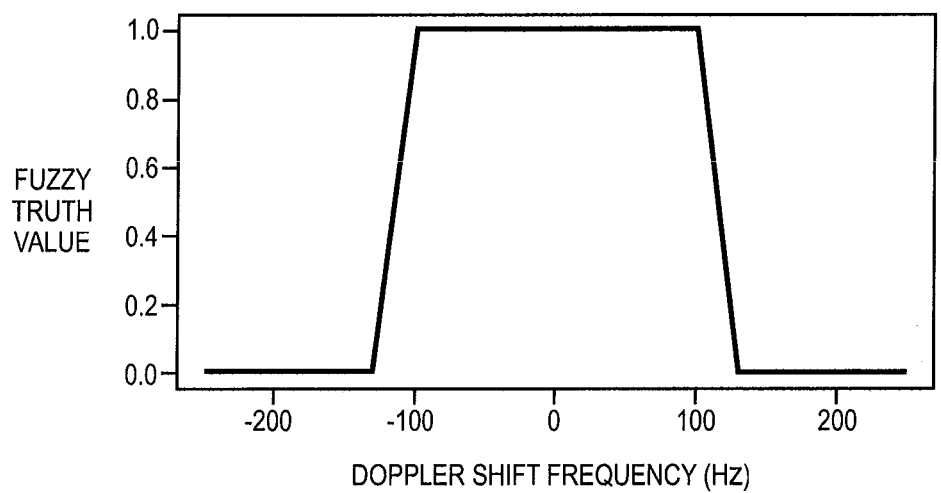
Figure 6C:
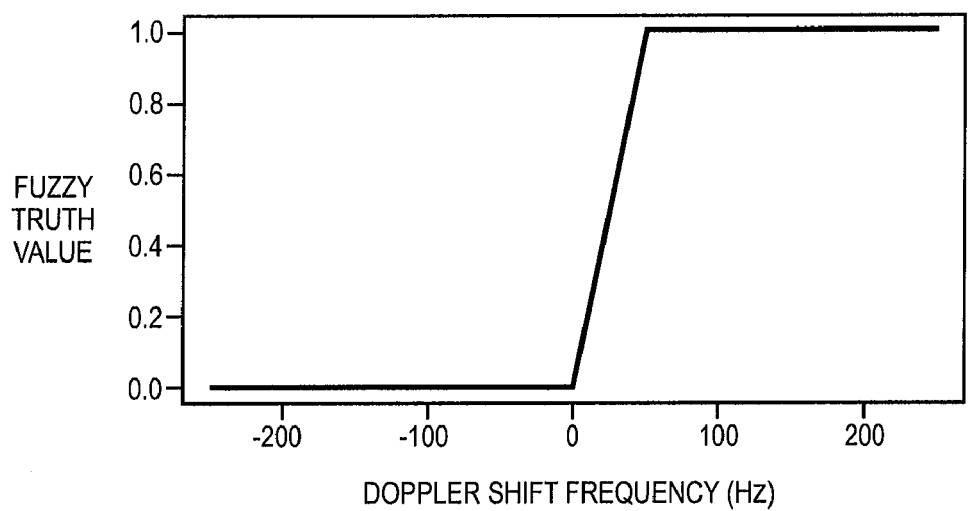
Figure 6D:
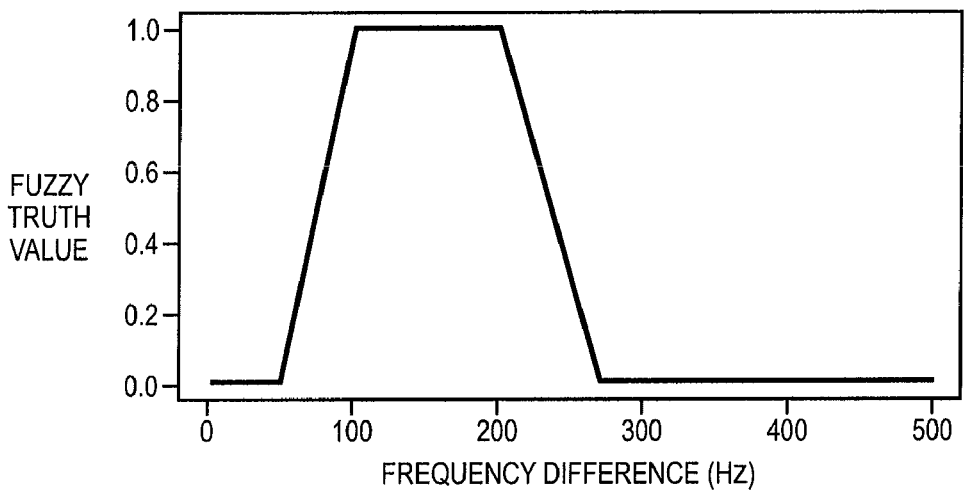
Figure 6E:
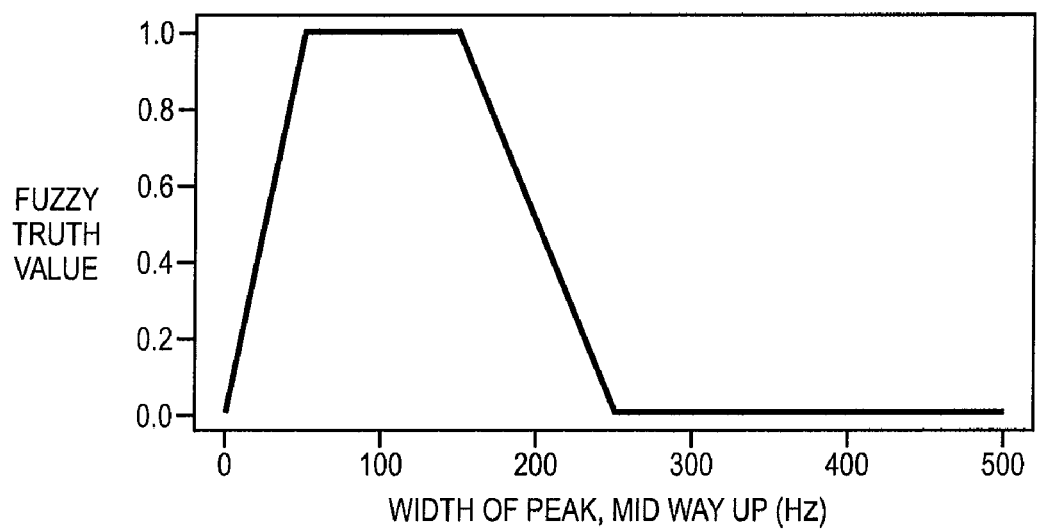
Figure 6F:
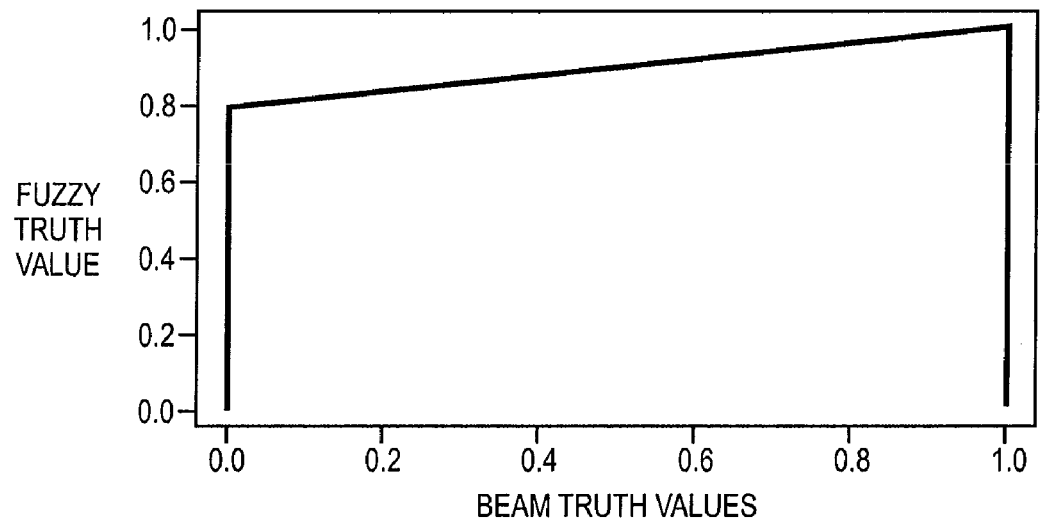
Figure 6G:
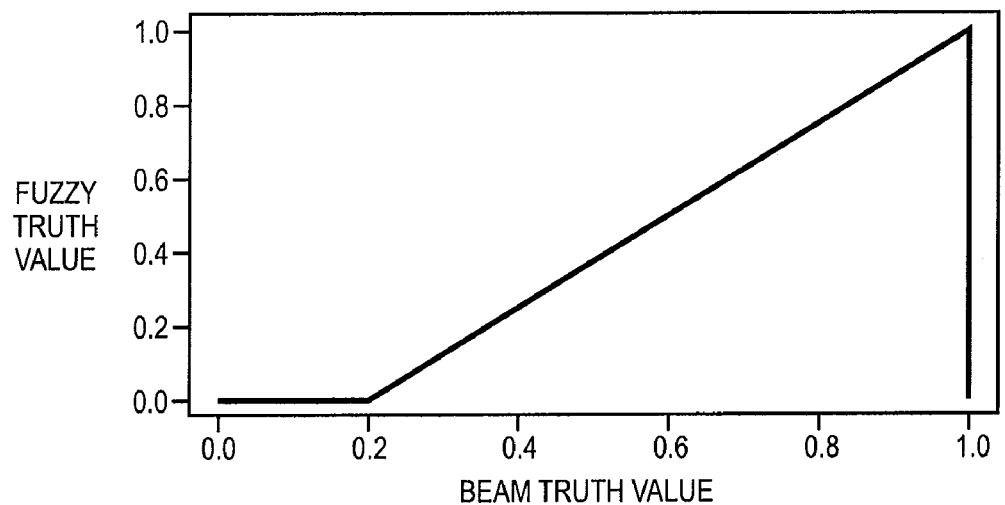
Figure 6H:
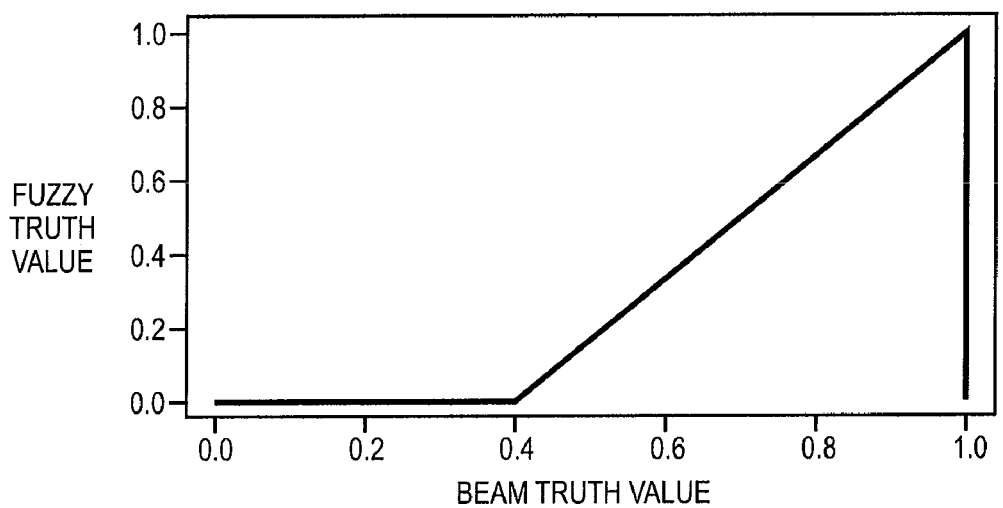

First, take the three truth values from the A, B, C beam decompositions, sort them from worst to best (ascending truth value) and apply the rules shown in FIGS. 6F, 6G and 6H (rule for worst beam rating, rule for second worst beam rating and rule for best beam rating, respectively). These three fuzzy rules provide truth values that are combined by taking the minimum (fuzzy AND operation), which gives the overall rating for the three beam decomposition at this one height.

The same analysis is done for the other two heights, so now the nine truth values have been reduced down to three, one each for 40 m, 50 m, and 60 m heights. This provides a measure of the 'believability' for the decomposition. What is desired is some indication how hard it's raining (RainWindRatio), how certain it is that it's raining (RainConf), and how much the wind measurements can be trusted (WindConf). These are evaluated independently at each height.

The RainWindRatio (at one height) is the weighted average of the RainWindRatios computed for the A, B, and C beams, where the A, B, C 'believability' rating is used as a weighting. The RainWindRatio is expressed in dB; for each beam it is: 10*log(RainPeakHeight/WindPeakHeight). Thus the combined weighted average is an average of dB's.

Figure 6I:
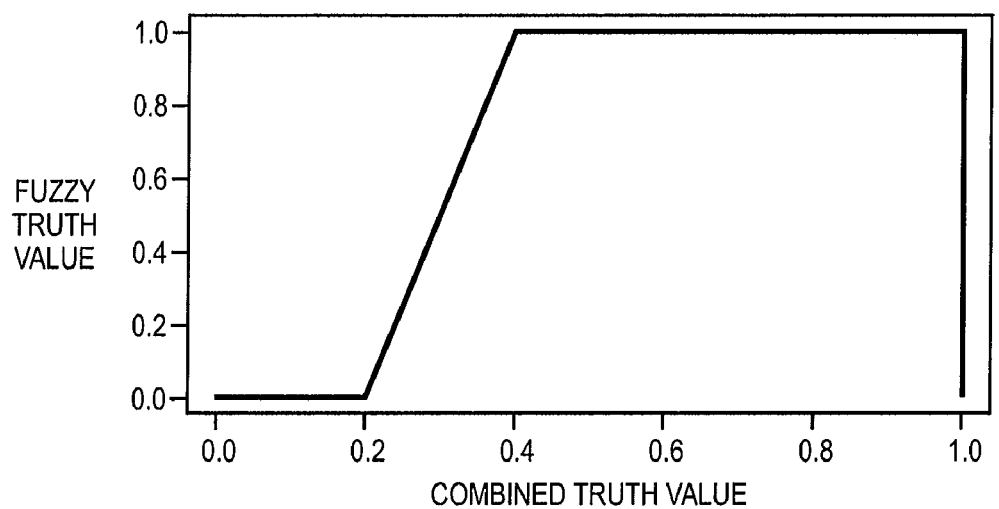
Figure 6J:
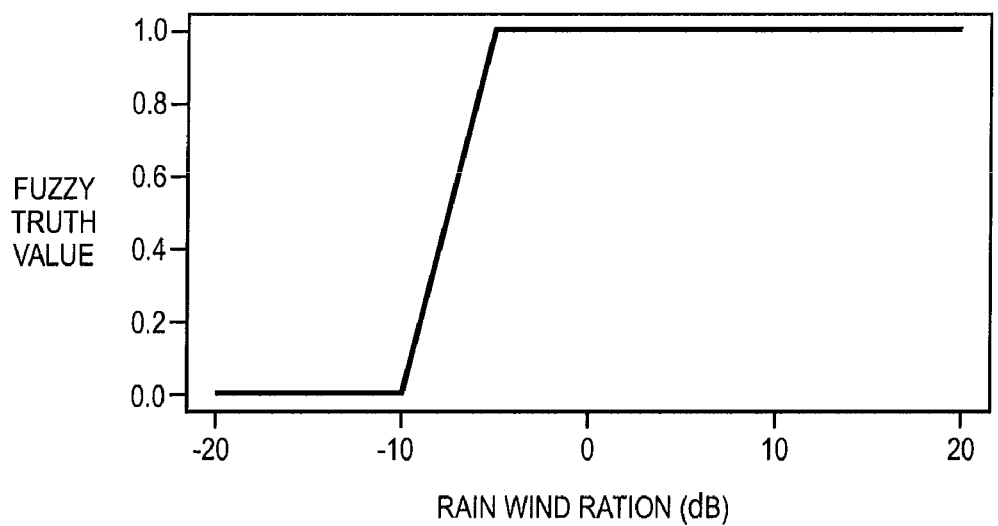

RainConf (at one height) is the minimum of the two fuzzy rule values shown in FIGS. 6I and 6J (rule #1 for rain confidence (combined truth value) and rule #2 for rain confidence (rain wind ratio), respectively), one of which (FIG. 6I) is evaluated on the combined rating of the A, B, C beams, and one (FIG. 6J) is evaluated on the combined RainWindRatio of the three beams.

Figure 6K:
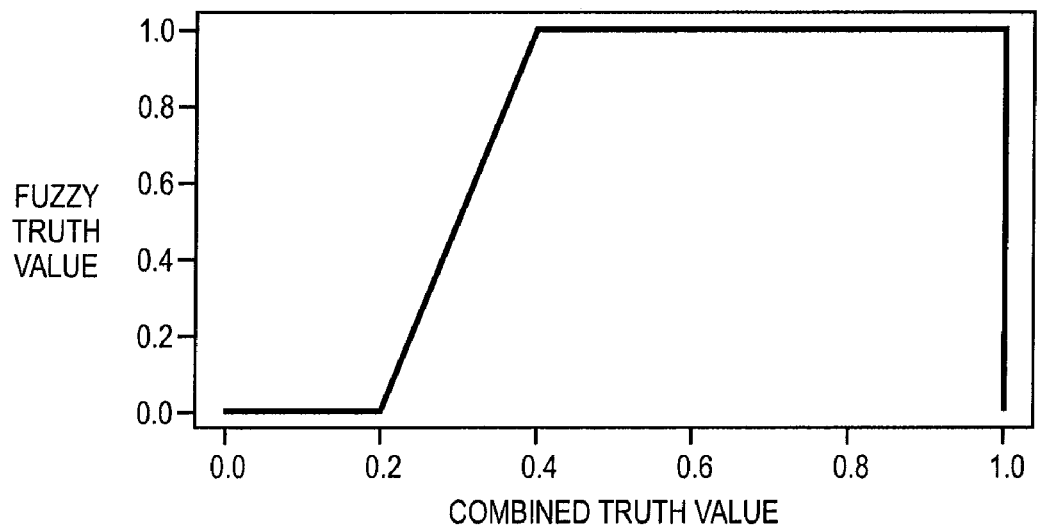
Figure 6L:
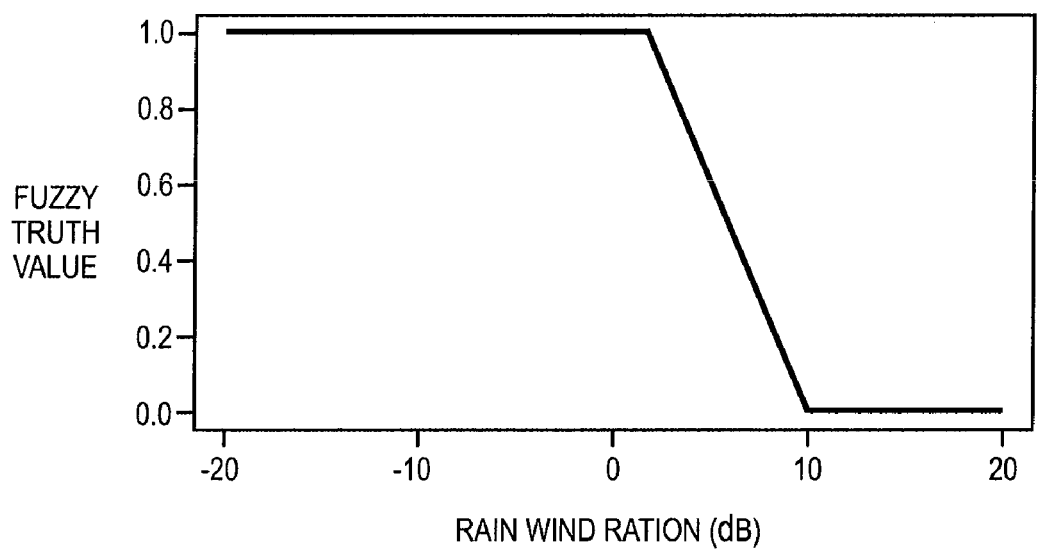

WindConf (at one height) is the minimum of the two fuzzy rule values shown in FIGS. 6K and 6L (rule #1 for wind confidence (combined truth value) and rule #2 for wind confidence (rain wind ratio), respectively).

This analysis provides the following set of numbers for each height, 40 m, 50 m, and 60 m.
1. Rating (combined believability indicator)
2. RainWindRatio (weighted average of each A, B, C beam)
3. RainConf (How certain are we that it's raining)
4. WindConf (How much can we trust the wind measurements)

Also, for each height spectral cutoffs for each beam are used in improved wind measurements.

The final step of combining the data from the three heights into a single set of numbers uses a weighted average. The rating (combined believability indicator) of each height is used as a weighting in each weighted average. In the end, then, the result is weighted averages for:
1. RainWindRatio
2. RainConf 3. WindConf.
4. Beam A Spectral Cutoff
5. Beam B Spectral Cutoff
6. Beam C Spectral Cutoff
See steps 420, 422 and 424.

Figure 7:
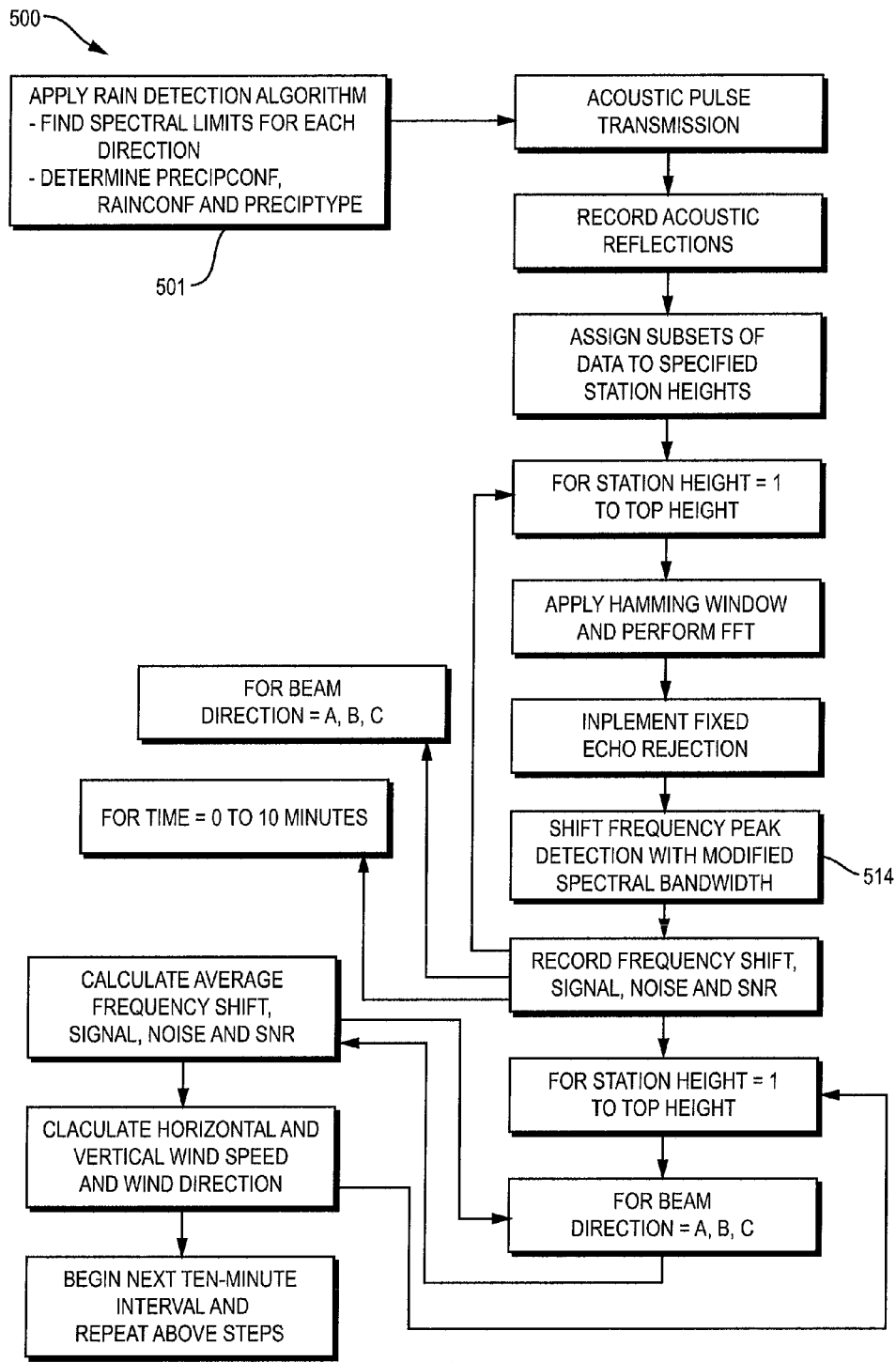
FIG. 7 shows certain steps of the preferred embodiment of the inventive method to estimate the wind velocity and the confidence in the wind velocity given information about the presence of precipitation and isolation of the precipitation-related portion of the spectra.

A preferred embodiment of the inventive method 500 for using a sodar apparatus to estimate wind speed in the presence of rain using the above information is shown in FIG. 7. The signal processing discussed above and shown in FIG. 5 is the first step in FIG. 7, step 501. The only other difference between the inventive method 500 and the typical prior art method shown in FIG. 3 is that the inventive method in step 514 applies modified spectral limits as calculated in step 501 to the shifted frequency peak detection.

Preferably, the results of the rain detection algorithm are applied only to the data taken in the time block or averaging period during which these results were calculated. This is preferable since there may be significant variations in precipitation from one averaging period to the next. In practice, it may be difficult to accomplish this, as the results of the rain detection algorithm will only be available when the full (for example 5 or 10 minute) averaging period has elapsed. Due to the size of the raw spectral data sets, and due to practical limits of hardware memory typically provided within the sodar apparatus' signal processing equipment, it may be impractical to preserve the raw data until the modified spectral bandwidth to be used with the data is available. In this case, an alternative embodiment is possible where the rain statistics and modified spectral bandwidth are calculated during one averaging period, and these values are used during the subsequent averaging period. The method works on a continuing basis where winds are estimated during each averaging period based on rain statistics and a modified spectral bandwidth from the immediately prior averaging period. Of course, if the memory is available then it is better to practice the preferred embodiment.

FIGS. 9A and 9B and 10A and 10B illustrate data determined using the preferred embodiment of the inventive method. These data illustrate that the invention is able to more accurately estimate wind speed in the presence of rain and to more reliably detect when accurate estimation of wind is not possible due to rain as compared to the prior art methods, for example the method illustrated in FIG. 3.

Figure 9A:
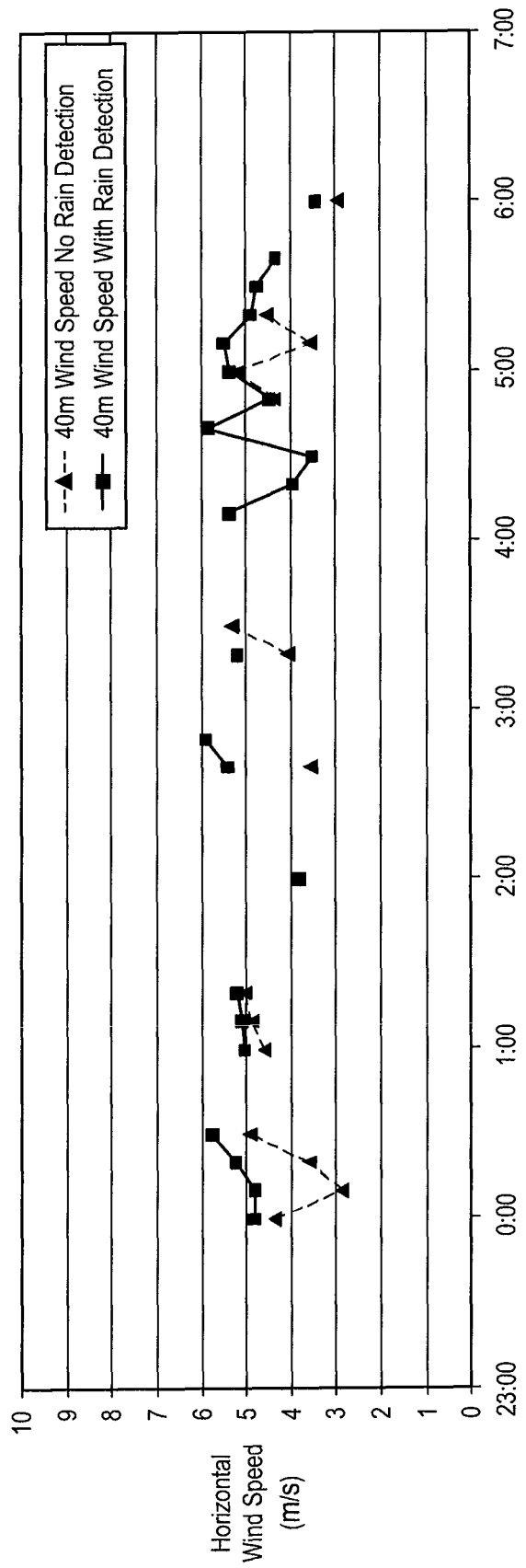
FIGS. 9A and 9B show a time series of horizontal and vertical wind data, respectively, measured using a sodar apparatus comparing the prior art signal processing technique of FIG. 3 to the inventive signal processing method.

FIG. 9A is a time series of averages of horizontal wind speed measured at a 40 meter elevation above the apparatus over the course of about six hours. In this chart, data processed in the conventional manner is shown as triangles connected by dashed lines, while data processed using the preferred embodiment of the invention is shown as squares connected by solid lines. It is apparent from FIG. 9A that the inventive method reports more data, and that data is more consistent than using the prior art technique.

Figure 9B:
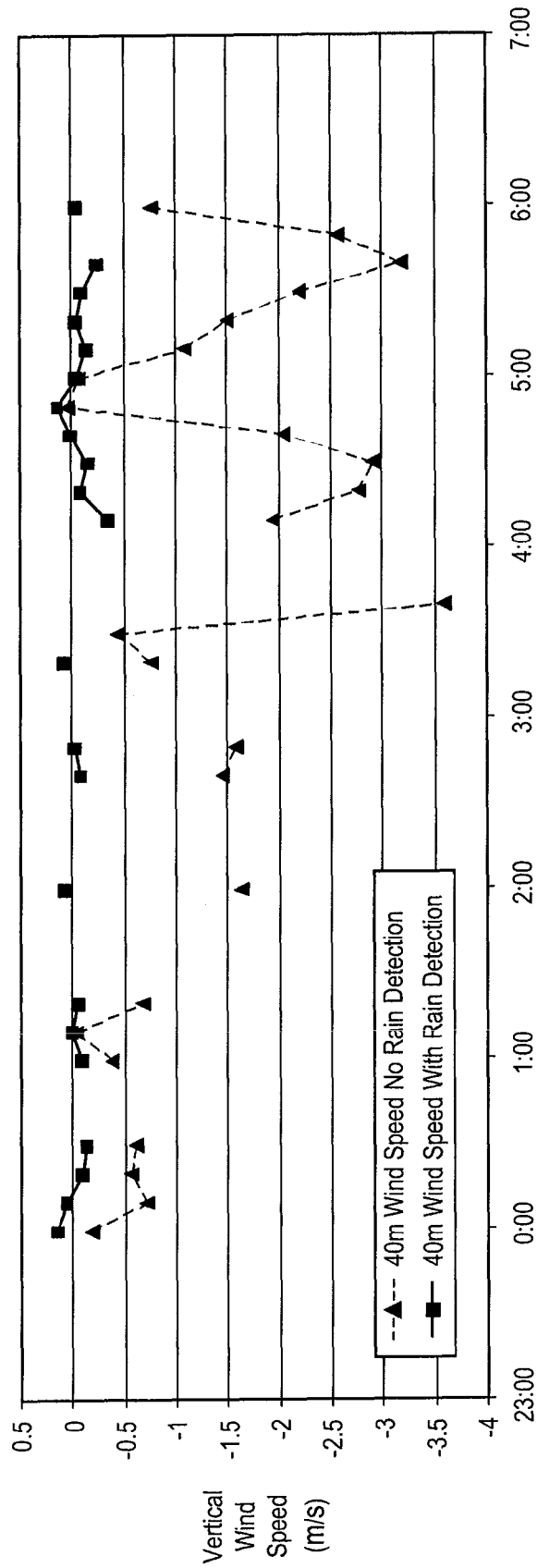

FIG. 9B shows the vertical wind speed using the same symbols for the prior art and inventive methods, using the same data as with FIG. 9A. In this chart the extreme and incorrect values of vertical wind velocity measured by the apparatus in the presence of rain are clearly visible, while the data as corrected by the inventive method shows reasonable values for vertical wind velocity.

Figure 10A:
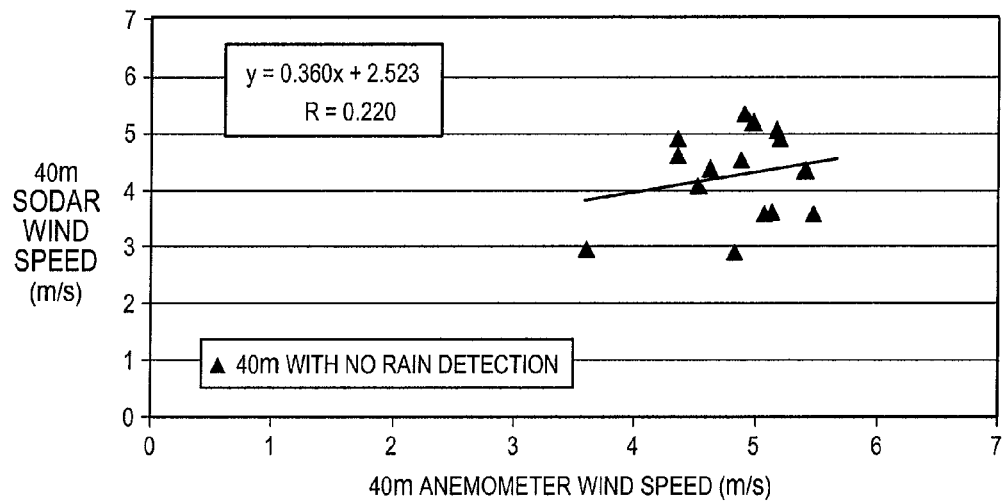
FIG. 10A is a scatterplot showing the correlation between conventional anemometer measurements and sodar wind velocities measured using prior art signal processing techniques during a period of precipitation.
Figure 10B:
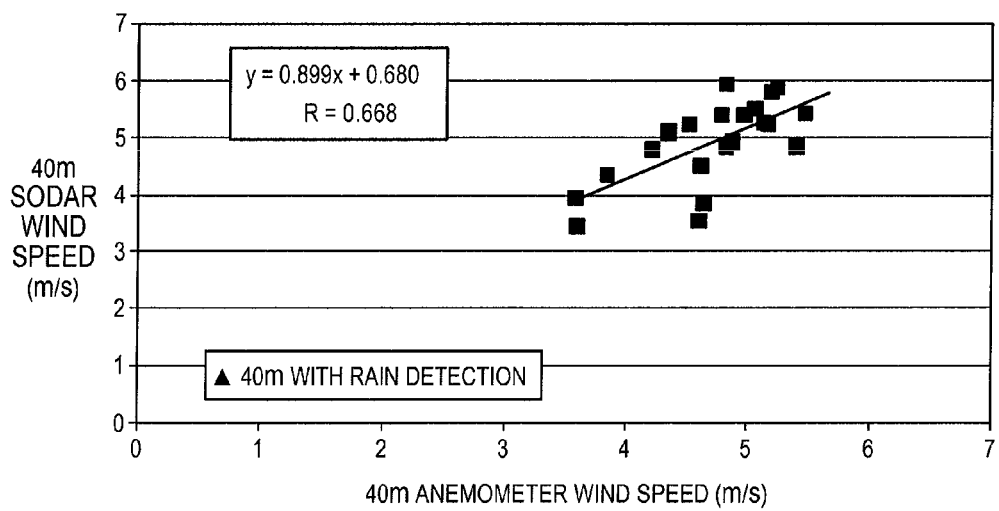
FIG. 10B is a scatterplot of the same data using the preferred embodiment of the inventive method.

FIGS. 10A and 10B are scatter plots and least squares linear fits for the data reported in FIG. 9A compared to data collected from a cup type anemometer mounted at a 40 meter elevation on a nearby tower. FIG. 10A shows the data processed in the conventional (prior art) manner as illustrated in FIG. 3. The correlation is poor, the slope of the linear regression, which would be 1.0 for perfect correlation, is 0.360 and the correlation coefficient R=0.220 is quite poor. FIG. 10B shows the same data compared to the same anemometer data, but in this case the data is processed using the preferred embodiment of the invention: the slope is 0.899, and the correlation coefficient is 0.688, both values being much closer to what would be expected if the two measures of wind speed agreed perfectly.

With reference to the correlation shown in FIG. 10B, it is important to note that perfect correlation, on an average block by average block basis, between cup anemometer and sodar apparatus is not to be expected for a number of reasons known to those skilled in the art. These reasons include the necessary physical separation between the sodar apparatus and the tower on which the anemometer is mounted, and the fact that the sodar apparatus measures velocity averaged over a significant volume of air, while the cup anemometer is making a near-point-source measurement. Further, any lack of correlation may in part be due to degraded performance of the cup anemometer itself in the presence of precipitation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of detecting precipitation with a sodar apparatus that transmits sound beams into the atmosphere, detects echoes returned from the atmosphere, from the echoes determines a Doppler-shifted spectrum comprising the relative strength of the echoes at various Doppler-shifted frequencies, and estimates wind speed and direction, the method comprising:

automatically estimating the presence of precipitation based on the Doppler-shifted spectrum;

using the estimated presence of precipitation to automatically improve the accuracy of the wind speed estimate made in the presence of the rain; and automatically estimating the severity of rain based on the Doppler-shifted spectrum;

wherein the rain severity estimates are used to more accurately determine when the presence of rain has degraded the reliability of a wind estimate.

2. The method of claim 1 in which automatically estimating the presence of precipitation comprises automatically distinguishing a frequency or frequency range in the Doppler-shifted spectrum that is associated with wind velocity from a frequency or frequency range in the Doppler-shifted spectrum that is associated with precipitation.

3. The method of claim 2 in which automatically distinguishing a frequency or frequency range in the Doppler-shifted spectrum that is associated with wind velocity from a frequency or frequency range in the Doppler-shifted spectrum that is associated with precipitation comprises automatically identifying two distinct peaks in the Doppler shifted spectrum, one such peak being associated with rain velocity and the other being associated with wind velocity.

4. The method of claim 3 further comprising automatically determining the predominant frequency of each peak individually.

5. The method of claim 4 further comprising automatically determining when the peaks are not sufficiently distinct to accurately estimate wind speed, as a determination of reliability.

6. The method of claim 5 where the spectra of a number of samples in an averaging period are used to make the wind speed estimate and the determination of reliability.

7. The method of claim 6 in which identifying two distinct peaks comprises applying a curve fit to the averaged spectra.

8. The method of claim 7 where the curve fit is a higher order polynomial curve fit of the logarithm of the spectrum.

9. The method of claim 8 where quadratic curves are fit to the peaks of the higher order polynomial, said quadratic curves being subsequently used to generate two Gaussian curves, one representing the region of the spectrum associated with precipitation and the other representing the region of the spectrum associated with wind velocity.

10. The method of claim 3 where properties of the two peaks are used to estimate the severity of rain, to more accurately estimate the wind speed in the presence of precipitation by limiting the section of the spectrum analyzed to estimate wind speed to that part of the spectrum likely due to wind alone and not due to precipitation, and to estimate the degree to which precipitation is degrading the accuracy of the estimate of wind speed.

11. The method of claim 10 where a fuzzy logic technique is used to make the estimates of the presence of precipitation, to limit the section of the spectrum analyzed and to estimate the degradation in wind speed accuracy.

12. The method of claim 8 in which the higher order polynomial is an octic, or eighth-order polynomial.

13. The method of claim 3 in which automatically identifying two distinct peaks in the Doppler-shifted spectrum comprises automatically eliminating one or more excess peaks if there are more than two peaks.

14. The method of claim 13 in which automatically eliminating one or more excess peaks if there are more than two peaks comprises discarding the lowest frequency peak if it has the lowest amplitude of the peaks.

15. The method of claim 14 in which automatically eliminating one or more excess peaks if there are more than two peaks further comprises discarding all peaks except the two with the greatest amplitudes.

16. The method of claim 8 in which automatically identifying two distinct peaks in the Doppler shifted spectrum comprises finding an inflection point on the spectrum, and treating that as the second peak.

17. The method of claim 16 in which treating the inflection point as a second peak comprises altering the spectrum by adding to the polynomial a term that increases or decreases with frequency, so as to change a local inflection point into a local maximum such that the resulting polynomial has two maxima.

18. A method of detecting precipitation with a sodar apparatus that transmits sound beams into the atmosphere, detects echoes returned from the atmosphere, from the echoes determines a Doppler-shifted spectrum comprising the relative strength of the echoes at various Doppler-shifted frequencies, and estimates wind speed and direction, the method comprising:

a) automatically estimating the presence of precipitation based on the Doppler-shifted spectrum by automatically distinguishing a frequency or frequency range in the Doppler-shifted spectrum that is associated with wind velocity from a frequency or frequency range in the Doppler-shifted spectrum that is associated with precipitation, in which automatically distinguishing a frequency or frequency range in the Doppler-shifted spectrum that is associated with wind velocity from a frequency or frequency range in the Doppler-shifted spectrum that is associated with precipitation comprises:
i) automatically identifying two distinct peaks in the Doppler shifted spectrum, one such peak being associated with rain velocity and the other being associated with wind velocity, in which identifying two distinct peaks comprises applying a curve fit to the averaged spectra where the curve fit is a higher order polynomial curve fit of the logarithm of the spectrum;
ii) automatically determining the predominant frequency of each peak individually; and
iii) automatically determining when the peaks are not sufficiently distinct to accurately estimate wind speed as a determination of reliability, where the spectra of a number of samples in an averaging period are used to make the wind speed estimate and the determination of reliability;
b) using the estimated presence of precipitation to automatically improve the accuracy of the wind speed estimate made in the presence of the rain;
c) automatically estimating the severity of rain based on the Doppler-shifted spectrum; and
d) using the rain severity estimates to more accurately determine when the presence of rain has degraded the reliability of a wind estimate.

19. The method of claim 18 where quadratic curves are fit to the peaks of the higher order polynomial, said quadratic curves being subsequently used to generate two Gaussian curves, one representing the region of the spectrum associated with precipitation and the other representing the region of the spectrum associated with wind velocity.

20. The method of claim 18 where properties of the two peaks are used to estimate the severity of rain, to more accurately estimate the wind speed in the presence of precipitation by limiting the section of the spectrum analyzed to estimate wind speed to that part of the spectrum likely due to wind alone and not due to precipitation, and to estimate the degree to which precipitation is degrading the accuracy of the estimate of wind speed.

21. The method of claim 18 where a fuzzy logic technique is used to make the estimates of the presence of precipitation, to limit the section of the spectrum analyzed and to estimate the degradation in wind speed accuracy.

22. The method of claim 18 in which the higher order polynomial is an octic, or eighth-order polynomial.

23. The method of claim 18 in which automatically identifying two distinct peaks in the Doppler-shifted spectrum comprises automatically eliminating one or more excess peaks if there are more than two peaks.

24. The method of claim 23 in which automatically eliminating one or more excess peaks if there are more than two peaks comprises discarding the lowest frequency peak if it has the lowest amplitude of the peaks.

25. The method of claim 24 in which automatically eliminating one or more excess peaks if there are more than two peaks further comprises discarding all peaks except the two with the greatest amplitudes.

26. The method of claim 18 in which automatically identifying two distinct peaks in the Doppler shifted spectrum comprises finding an inflection point on the spectrum, and treating that as the second peak.

27. The method of claim 26 in which treating the inflection point as a second peak comprises altering the spectrum by adding to the polynomial a term that increases or decreases with frequency, so as to change a local inflection point into a local maximum such that the resulting polynomial has two maxima.

28. The method of claim 1, wherein using the rain severity estimates to more accurately determine when the presence of rain has degraded the reliability of a wind estimate comprises:

applying a set of fuzzy logic rules to a measure of a Gaussian curve generated by each sound beam of a set of sound beams transmitted by the sodar apparatus at a given beam height to generate a set of truth values for each sound beam at the given beam height;

detecting a minimum truth value of the set of truth values for each sound beam at the given beam height;

combining the minimum truth values for the set of sound beams at the given beam height to generate a beam accuracy rating;

applying the beam accuracy rating to an average of the rain-to-wind ratios for each sound beam to generate a weighted average of the rain-to-wind ratios for the sound beams; and detecting a minimum truth value for a first wind confidence rule and a second wind confidence rule, the second wind confidence rule associated with the weighted average of the rain-to-wind ratios for the sound beams to generate a wind confidence rule.

29. The method of claim 28, wherein combining the minimum truth values for the set of sound beams at the given beam height to generate a beam accuracy rating comprises:

sorting the minimum truth values for the sound beams at the given beam height in an ascending truth value order;

applying beam rating rules to the minimum truth values based upon the ascending truth value order of the minimum truth values to generate beam rating truth values; and taking the minimum of the beam rating truth values to generate the beam accuracy rating.

* * * * *